(12) United States Patent
Fujishima et al.

(10) Patent No.: US 7,332,084 B2
(45) Date of Patent: Feb. 19, 2008

(54) PROCESS FOR BIOLOGICAL TREATMENT OF ORGANIC WASTEWATER AND APPARATUS THEREFOR

(75) Inventors: Shigeki Fujishima, Tokyo (JP); Motoyuki Yoda, Tokyo (JP)

(73) Assignee: Kurita Water Industries, Ltd., Tokyo (JP)

( * ) Notice: Subject to any disclaimer, the term of this patent is extended or adjusted under 35 U.S.C. 154(b) by 0 days.

(21) Appl. No.: 11/485,429

(22) Filed: Jul. 13, 2006

(65) Prior Publication Data

US 2006/0249448 A1   Nov. 9, 2006

Related U.S. Application Data

(63) Continuation of application No. PCT/JP2005/000891, filed on Jan. 25, 2005.

(30) Foreign Application Priority Data

| | | |
|---|---|---|
| Feb. 2, 2004 | (JP) | 2004-025702 |
| Mar. 30, 2004 | (JP) | 2004-099967 |
| Jun. 8, 2004 | (JP) | 2004-170121 |
| Aug. 10, 2004 | (JP) | 2004-233257 |
| Aug. 10, 2004 | (JP) | 2004-233258 |

(51) Int. Cl.
*C02F 3/30* (2006.01)
*C02F 3/08* (2006.01)
*C02F 3/12* (2006.01)

(52) U.S. Cl. .............. 210/605; 210/609; 210/617; 210/623

(58) Field of Classification Search ............. 210/605, 210/609, 615–617, 621–623, 630, 631, 252, 210/259

See application file for complete search history.

(56) References Cited

U.S. PATENT DOCUMENTS

| | | | | |
|---|---|---|---|---|
| 3,356,609 A | * | 12/1967 | Bruemmer | 210/610 |
| 3,764,523 A | * | 10/1973 | Stankewich, Jr. | 210/604 |
| 3,803,029 A | * | 4/1974 | Blecharczyk | 210/618 |
| 3,980,556 A | * | 9/1976 | Besik | 210/616 |
| 4,443,337 A | * | 4/1984 | Otani et al. | 210/602 |

(Continued)

FOREIGN PATENT DOCUMENTS

JP   S55-020649   2/1980

(Continued)

*Primary Examiner*—Fred G. Prince
(74) *Attorney, Agent, or Firm*—Manabu Kanesaka

(57) ABSTRACT

A multistage activated sludge process involving a predation effect caused by microorganisms realizes further improvement in treatment efficiency and further decrease in the amount of excess sludge generated while a stable quality of the treated water is maintained. This process includes a first biological treatment process for treating BOD in organic wastewater at a high load to convert the BOD to dispersed bacteria, and a second biological treatment process for forming the converted dispersed bacteria into a floc and allowing microorganisms to coexist. The second biological treatment process is performed under a condition of pH 5 to 6. Alternatively, an excess sludge treatment process for decomposing at least a part of sludge in the second biological treatment process and/or sludge obtained by performing solid-liquid separation of sludge in the second biological treatment process under aerobic conditions, and returning the treated sludge to the first biological treatment process and/or the second biological treatment process is performed under a condition of pH 5 to 6.

20 Claims, 25 Drawing Sheets

U.S. PATENT DOCUMENTS

| | | | | |
|---|---|---|---|---|
| 4,999,111 | A | * | 3/1991 | Williamson .................. 210/605 |
| 5,019,268 | A | * | 5/1991 | Rogalla ....................... 210/617 |
| 5,213,681 | A | * | 5/1993 | Kos ........................... 210/605 |
| 5,252,214 | A | * | 10/1993 | Lorenz et al. ............... 210/605 |
| 5,288,405 | A | * | 2/1994 | Lamb, III ................... 210/605 |
| 6,039,875 | A | * | 3/2000 | Christiansen et al. ....... 210/606 |
| 6,083,395 | A | * | 7/2000 | Katsura et al. ............. 210/606 |

FOREIGN PATENT DOCUMENTS

| | | | |
|---|---|---|---|
| JP | S55-20649 | | 6/1980 |
| JP | S57-074082 | | 5/1982 |
| JP | 57-117380 | * | 7/1982 |
| JP | S58-089990 | | 5/1983 |
| JP | S63-093399 | | 4/1988 |
| JP | 10-323682 | * | 12/1998 |
| JP | H11-047784 | | 2/1999 |
| JP | H11-277087 | | 10/1999 |
| JP | 2000-210692 | | 8/2000 |
| JP | 2001-145894 | | 5/2001 |

* cited by examiner

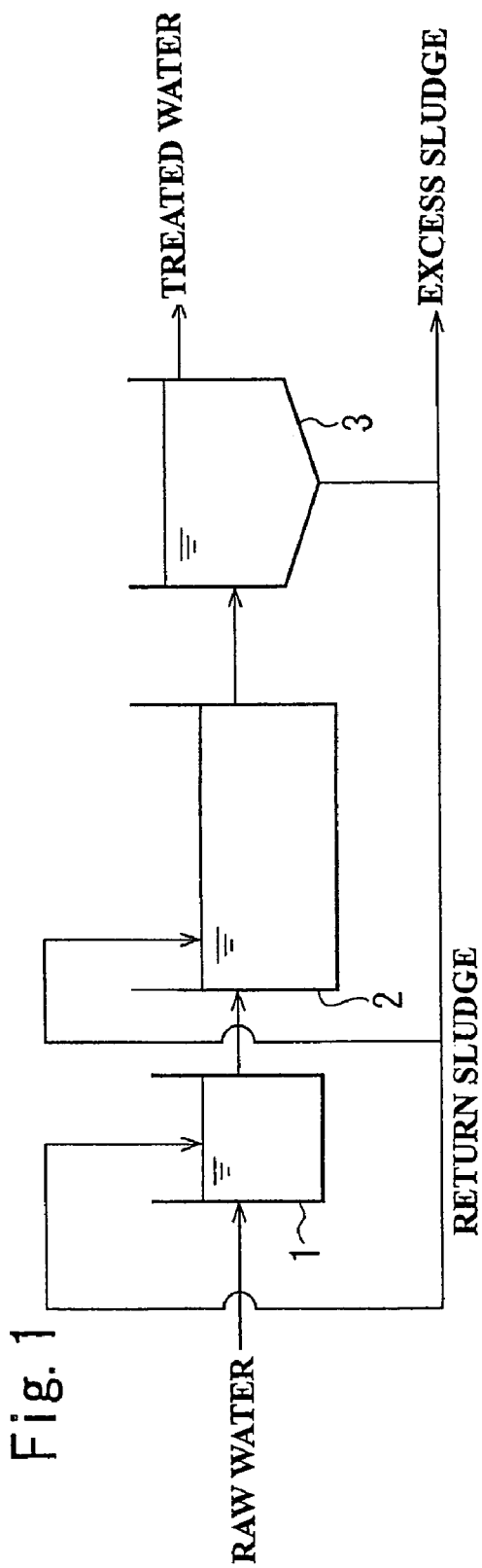

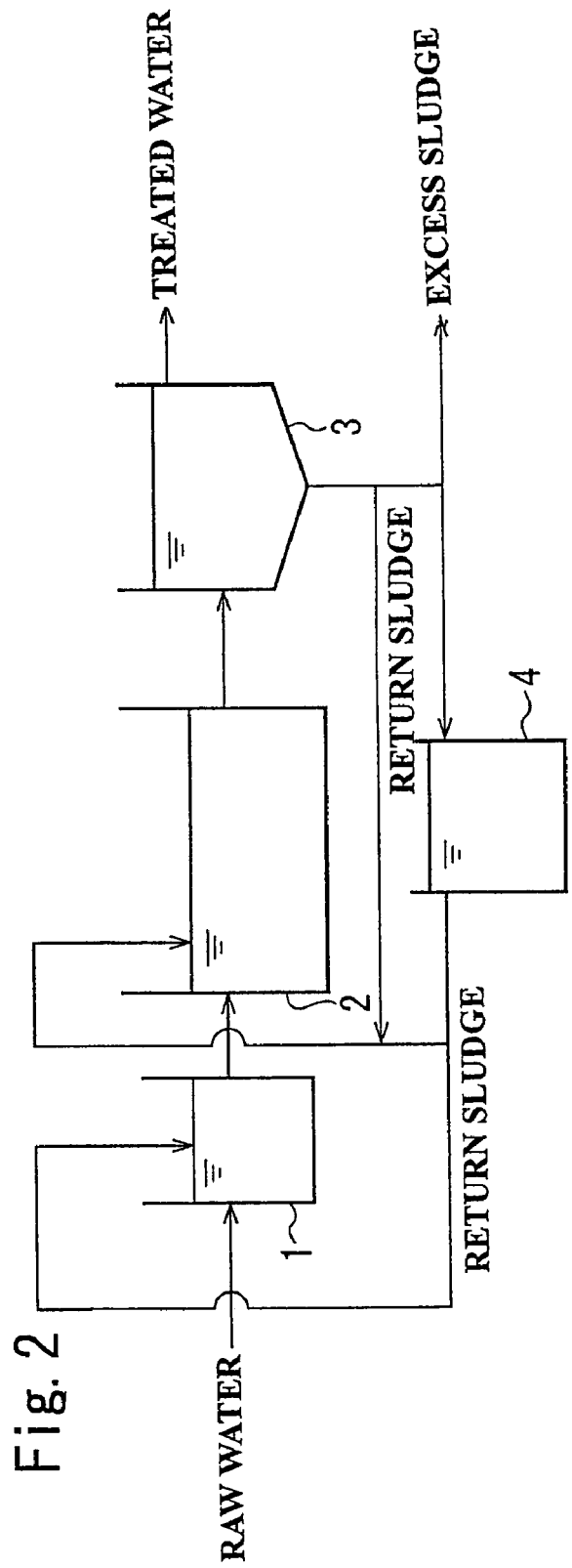

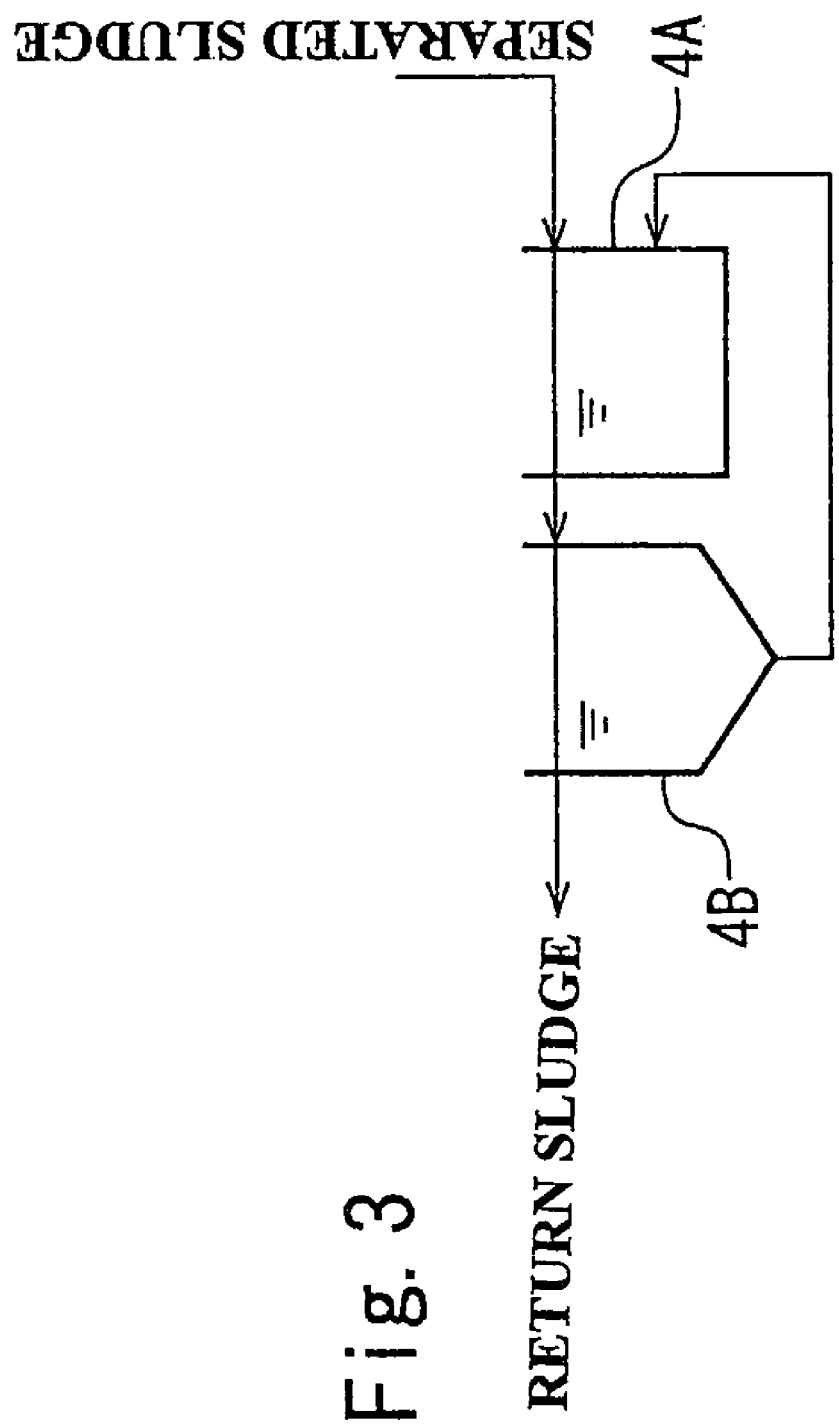

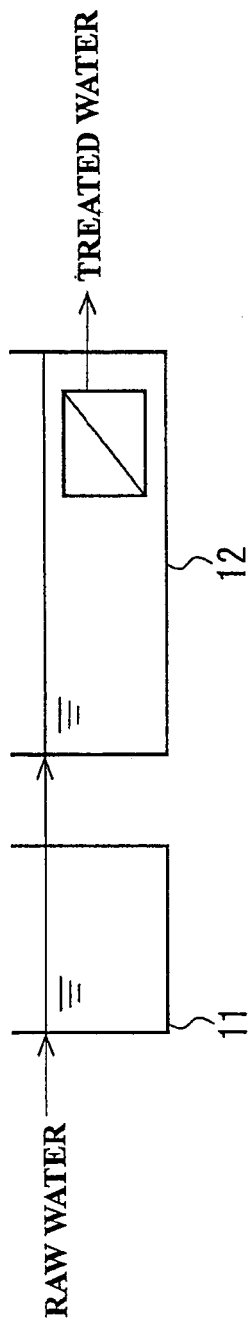
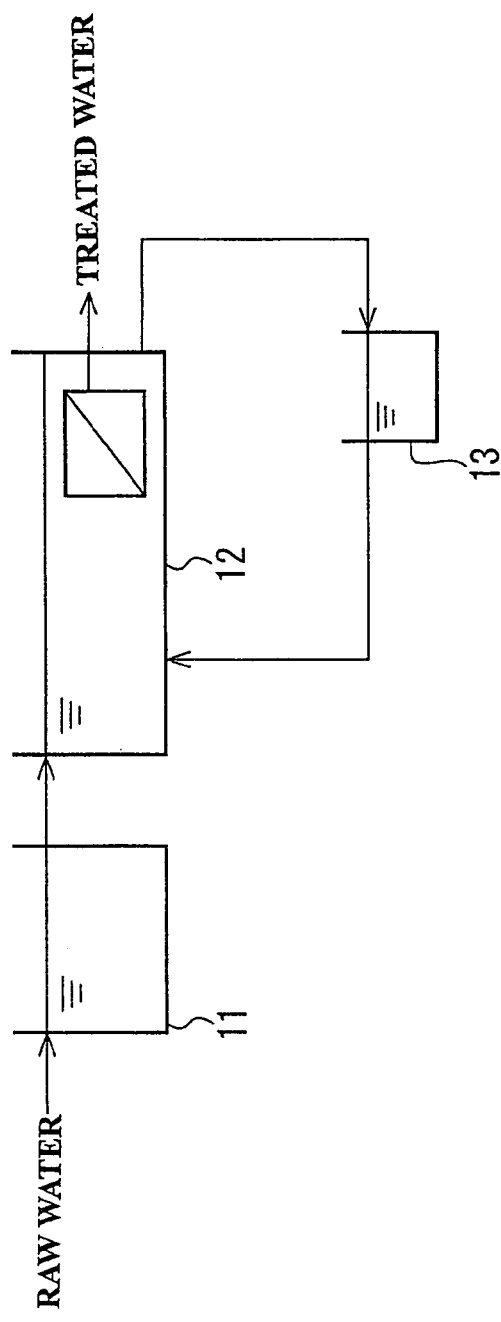

PROCESS FOR BIOLOGICAL TREATMENT OF ORGANIC WASTEWATER AND APPARATUS THEREFOR

CROSS REFERENCE TO RELATED APPLICATION

This is a continuation application of PCT/JP2005/000891 filed on Jan. 25, 2005.

FIELD OF THE INVENTION

The present invention relates to a process for biological treatment of organic wastewater and an apparatus therefor.

BACKGROUND OF THE INVENTION

It is desirable to develop a process for biological treatment of organic wastewater that can be employed for the treatment of organic wastewater having a wide range of contaminant concentrations, such as domestic wastewater, sewage, wastewater from food plants and pulp plants. In particular, it is desirable to develop a process for biological treatment of organic wastewater in which treatment efficiency can be improved and the amount of excess sludge generated can be reduced without degrading the quality of the treated water.

An activated sludge process used in the biological treatment of organic wastewater is widely used for sewage treatment, industrial wastewater treatment, and the like because this process is advantageous in that, for example, the quality of the treated water is satisfactory and maintenance can be easily performed. However, the biochemical oxygen demand (BOD) volume loads in the activated sludge process range from about 0.5 to 0.8 kg/m$^3$/d, and thus a large site area is necessary. Since 20% of the decomposed BOD is converted into bacterial cells, that is, sludge, a large amount of excess sludge must be treated.

A fluidized bed process in which a carrier is added is known as a high-load treatment of organic wastewater. In this process, the operation can be performed at a BOD volume load of 3 kg/m$^3$/d or more. However, in this process, the amount of generated sludge corresponds to about 30% of the decomposed BOD, which is larger than that in the existing activated sludge process.

According to a process disclosed in Japanese Examined Patent Application Publication No. 56-48235, first, organic wastewater is treated with bacteria in a first treatment tank. In this treatment, organic substances contained in the wastewater are subjected to oxidative decomposition and are converted to bacterial cells of non-flocculating bacteria. Subsequently, the bacterial cells are removed by being preyed upon by sessile protozoa in a second treatment tank. This process reduces the amount of excess sludge. Japanese Examined Patent Application Publication No. 62-54073 also describes a similar two-stage biological treatment. These processes can realize a high-load operation and increase the efficiency of activated sludge treatment.

According to a description in Japanese Patent No. 3360076, in such a process of a two-stage biological treatment, activated sludge containing protozoa is drained from a biological treatment tank, subjected to sterilization and a solubilization treatment in a reaction treatment tank, and returned to the biological treatment tank, thereby further reducing the amount of excess sludge generated.

According to a process described in Japanese Patent No. 3410699, the former stage biological treatment is performed by means of a carrier-fluidized bed process and the latter stage biological treatment is performed by means of a multistage activated sludge process, thereby further reducing the amount of excess sludge generated. In this process, the activated sludge treatment in the latter stage is operated at a low load, a BOD sludge load of 0.1 kg-BOD/kg-mixed liquor suspended solids (MLSS)/d. Thus, the sludge is subjected to auto-oxidation to markedly reduce the amount of sludge drained.

According to Japanese Examined Patent Application Publication No. 55-20649, first, organic wastewater is treated with bacteria in a first treatment tank. In this treatment, organic substances contained in the wastewater are subjected to oxidative decomposition and are converted to bacterial cells of non-flocculating bacteria. Subsequently, the bacterial cells are removed by being preyed upon by sessile protozoa in a second treatment tank, thereby reducing the amount of excess sludge. Furthermore, this process can realize a high-load operation and increase treatment efficiency of the activated sludge process.

For example, Japanese Unexamined Patent Application Publication No. 2000-210692 proposes a countermeasure for a degradation of treatment performance caused by a fluctuation of the quality of raw water, which is a problem in the process disclosed in Japanese Examined Patent Application Publication No. 55-20649. Specific processes thereof include "a process in which the fluctuation of the BOD of water to be treated is controlled within 50% from the median of the average concentration", "a process in which the qualities of water in a first treatment tank and first treated water are measured with time", and "a process in which, when the quality of the first treated water deteriorates, a microbial preparation or seed sludge is added to the first treatment tank".

According to Japanese Examined Patent Application Publication No. 60-23832, when bacteria, yeast, actinomycetes, algae, mold, primary sedimentation sludge, or excess sludge of the wastewater treatment is preyed upon by protozoa or metazoa, the floc size of the above bait is reduced to be smaller than the mouth of the protozoa or metazoa by ultrasonic treatment or mechanical agitation.

The above-described multistage activated sludge process involving a predation effect caused by microorganisms has already been in practical use for the treatment of organic wastewater. For some types of target wastewater, this process can improve treatment efficiency and reduce the amount of sludge generated.

For example, when the process involving predation by animalcules is used, although the effect of reduction in the amount of sludge generated differs depending on process conditions or the quality of the wastewater, it is believed that this process can reduce the amount of sludge by about 30% to 70% of that generated in an existing activated sludge process.

However, although the effect of reduction in the amount of sludge generated differs depending on process conditions or the quality of the wastewater, the amount of sludge reduced in the above process is about half of the amount of sludge that is generated in a single-tank activated sludge process. The reason for this is that, in the microorganism tank used in the latter stage in which sludge that mainly contains bacteria is preyed upon, most of the sludge is not preyed upon and remains or the microorganisms that perform the predation cannot be maintained at high concentrations.

Furthermore, since the animalcules that perform the predation are higher living organisms than bacteria, the lifespan of the animalcules is long (the rate of autolysis of the animalcules is low). This makes it more difficult to reduce the amount of sludge.

In addition, some animalcules proliferate by division and some animalcules proliferate via eggs. A typical example of the latter metazoa is rotifers. It is believed that such animalcules contribute to the reduction in the amount of sludge. However, these animalcules are not always in a state of proliferation (in a state capable of laying eggs). Over ten days after hatching, the animalcule does not lay eggs. After another over ten days pass, the animalcule dies naturally. In addition, when these animalcules are dominant, even when the animalcules lay eggs, in the case where a sufficient number of imagoes exist or in the case where a large portion of sludge is composed of dung pat and the amount of bacteria serving as bait is small, the eggs cannot hatch in some cases. Consequently, the animalcules in the tank may die all at once. In the activated sludge process using animalcules, such a characteristic of metazoa makes it difficult to stably maintain the generation of a small amount of sludge for a long period of time.

In the multistage activated sludge process involving the autolysis of bacteria, regardless of the state of the bacteria (a dispersed state, a floc state, or a filamentous state), the amount of sludge generated can be reduced by about 50% of that generated in an existing activated sludge process. However, in order to achieve a 50% decrease in the amount of sludge generated, in the biological treatment tank in which the autolysis is performed, the sludge retention time must be set to a large value. Therefore, when a membrane separation device is introduced, the maintenance cost for the membrane cancels out the reduction in the operating cost due to the decrease in the amount of sludge generated.

Accordingly, in order to achieve a decrease of 50% or higher in the amount of sludge generated using an existing aerating tank with a low operating cost, it is effective to use animalcules. In order to stably achieve this, it is necessary to stably produce bacteria that are easily preyed upon by the animalcules in the biological treatment tank used in the former stage.

SUMMARY OF THE INVENTION

It is an object of the present invention to provide a process for biological treatment of organic wastewater in which treatment efficiency is further improved and the amount of excess sludge generated is further reduced while a stable quality of the treated water is maintained in a multistage activated sludge process involving a predation effect caused by microorganisms, and an apparatus therefor.

According to a process and an apparatus for biological treatment of organic wastewater of a first aspect, the process and the apparatus for biological treatment of organic wastewater include a first biological treatment process for treating BOD in organic wastewater at a high load to convert the BOD to dispersed bacteria, and a second biological treatment process for forming the converted dispersed bacteria into a floc and allowing microorganisms to coexist, wherein the second biological treatment process is performed under a condition of pH 5 to 6.

According to a process and an apparatus for biological treatment of organic wastewater of a second aspect, the process for biological treatment of organic wastewater includes a first biological treatment process for treating BOD in organic wastewater at a high load to convert the BOD to dispersed bacteria, and a second biological treatment process for forming the converted dispersed bacteria into a floc and allowing microorganisms to coexist, and an excess sludge treatment process for decomposing at least a part of sludge in the second biological treatment process and/or sludge obtained by performing solid-liquid separation of sludge in the second biological treatment process under aerobic conditions, wherein the sludge treated in the excess sludge treatment process is returned to the first biological treatment process and/or the second biological treatment process, and the excess sludge treatment process is performed under a condition of pH 5 to 6.

According to a process and an apparatus for biological treatment of organic wastewater of a third aspect, the process and the apparatus for biological treatment include introducing organic wastewater into a first biological treatment process to perform a biological treatment using non-flocculating bacteria, and introducing the treated water containing the non-flocculating bacteria from the first biological treatment process into a second biological treatment process to perform an activated sludge treatment, wherein at least a part of sludge in the second biological treatment processor sludge obtained by performing solid-liquid separation of sludge in the second biological treatment process is introduced into an anaerobic treatment process to perform an anaerobic treatment, and the product treated in the anaerobic treatment process is returned to the first biological treatment process and/or the second biological treatment process.

According to a process and an apparatus for biological treatment of organic wastewater of a fourth aspect, the process for biological treatment includes introducing organic wastewater into a first biological treatment process to perform a biological treatment using non-flocculating bacteria, and introducing the treated water containing the non-flocculating bacteria from the first biological treatment process into a second biological treatment process to perform an activated sludge treatment, wherein at least a part of sludge in the second biological treatment process or sludge obtained by performing solid-liquid separation of sludge in the second biological treatment process is introduced into an aerobic treatment process to oxidize it under aerobic conditions, at least a part of the product treated in the aerobic treatment process is introduced into an anaerobic treatment process to perform an anaerobic treatment, and the product treated in the anaerobic treatment process is returned to at least one of the first biological treatment process, the second biological treatment process, and the aerobic treatment process.

According to a process and an apparatus for biological treatment of organic wastewater of a fifth aspect, the process and the apparatus for biological treatment include introducing organic wastewater into a first biological treatment process to perform a biological treatment using bacteria, introducing the treated liquid containing the bacteria from the first biological treatment process into a second biological treatment process to perform an activated sludge treatment, performing solid-liquid separation of the treated liquid from the second biological treatment process to separate the treated liquid into sludge and treated water, and returning a part of the sludge to the second biological treatment process, wherein a part of the sludge in the second biological treatment process and/or the rest of the sludge obtained after the solid-liquid separation is introduced into a third biological treatment process to perform an aerobic treatment, a part of or all of the sludge subjected to the aerobic treatment is dehydrated to separate into solid content and water, the solid content is drained as excess sludge, and the water is returned to the first biological treatment process and/or the second biological treatment process.

According to a process and an apparatus for biological treatment of organic wastewater of a sixth aspect, the process and the apparatus for biological treatment include introducing organic wastewater into a first biological treatment tank to perform a biological treatment using bacteria, introducing the treated liquid containing the bacteria from the first biological treatment tank into a second biological treatment tank to perform an activated sludge treatment, wherein the sludge retention time of the second biological treatment tank is controlled to 5 to 40 days.

According to a process and an apparatus for biological treatment of organic wastewater of a seventh aspect, the process and the apparatus for biological treatment include introducing organic wastewater into a first biological treatment tank to perform a biological treatment using bacteria, introducing the treated liquid containing the non-flocculating bacteria from the first biological treatment tank into a second biological treatment tank to perform an activated sludge treatment, introducing sludge obtained by performing solid-liquid separation of sludge in the second biological treatment tank into a third biological treatment tank to oxidize it under aerobic conditions, and returning a part of or all of the product treated in the third biological treatment tank to the second biological treatment tank, wherein the sludge retention time of each of the second biological treatment tank and the third biological treatment tank is controlled to 5 to 40 days.

According to a process and an apparatus for biological treatment of organic wastewater of an eighth aspect, the process and the apparatus for biological treatment of organic wastewater include a first biological treatment process that treats BOD in organic wastewater at a high load to convert the BOD to bacteria, and a second biological treatment process in which the converted bacteria coexist with animalcules that prey upon the bacteria, wherein a hydraulic retention time (HRT) in the first biological treatment process required for converting 70% or more and less than 100% of the BOD in standard organic wastewater to bacteria is determined to be defined as a standard HRT, and a liquid is added to the organic wastewater introduced into the first biological treatment process such that the HRT in the first biological treatment process is controlled to be in the range of 0.75 to 1.5 times the standard HRT.

According to a process and an apparatus for biological treatment of organic wastewater a ninth aspect, the process and the apparatus for biological treatment of organic wastewater include a first biological treatment process that treats BOD in organic wastewater at a high load to convert the BOD to bacteria, and a second biological treatment process in which the converted bacteria coexist with animalcules that prey upon the bacteria, wherein a hydraulic retention time (HRT) in the first biological treatment process required for converting 70% or more and less than 100% of the BOD in standard organic wastewater to bacteria is determined to be defined as a standard HRT, and the amount of water in a treatment tank used in the first biological treatment process is varied such that the HRT in the first biological treatment process is controlled to be in the range of 0.75 to 1.5 times the standard HRT.

In the eighth and ninth aspects, the term "standard organic wastewater" means organic wastewater having a standard BOD concentration at a standard temperature, the organic wastewater being subjected to a biological treatment, that is, the organic wastewater whose flow rate, temperature, and BOD concentration being changed with time. The standard temperature and the standard BOD concentration are defined as follows.

Standard temperature: The lowest temperature over the year which includes the case where warming is performed.

Standard BOD concentration: The maximum BOD concentration of wastewater introduced into the first biological treatment process.

BRIEF DESCRIPTION OF THE DRAWINGS

FIG. 1 is a flow diagram showing an embodiment of a process for biological treatment of organic wastewater according to a first aspect of the present invention.

FIG. 2 is a flow diagram showing an embodiment of a process for biological treatment of organic wastewater according to a second aspect of the present invention.

FIG. 3 is a flow diagram showing an embodiment of an excess sludge treatment process.

FIG. 4a is a flow diagram showing an experimental apparatus used in Example 1, and FIG. 4b is a flow diagram showing an experimental apparatus used in Example 2.

BEST MODE FOR CARRYING OUT THE INVENTION

[First and Second Aspects]

Figure 5:
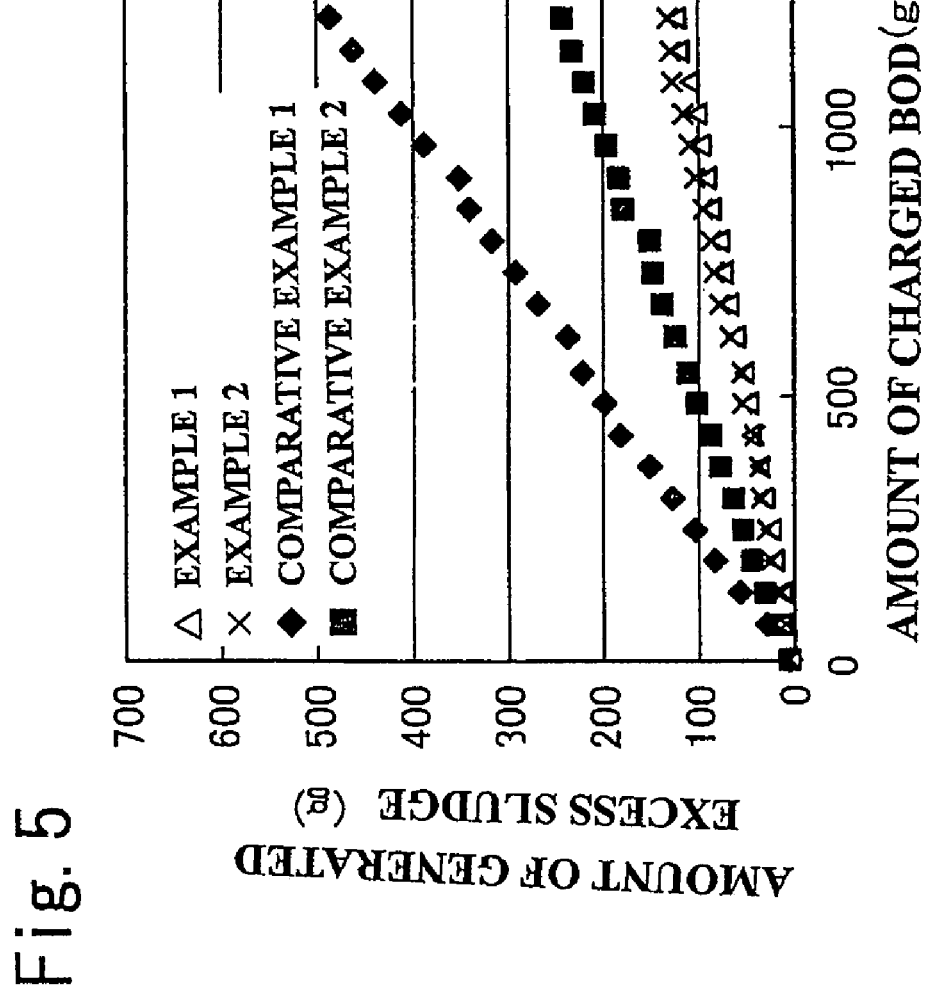
FIG. 5 is a graph showing the relationship between the amount of charged BOD and the amount of excess sludge generated in Examples 1 and 2 and Comparative Examples 1 and 2.

When aerobic treatment of organic wastewater is performed by means of a known single-tank activated sludge process under an acidic condition of pH 6 or lower, large amounts of fungi are generated, resulting in bulking. However, as in the process of the present invention, when a first biological treatment process for transforming a BOD into dispersed bacterial cells is performed under a neutral condition of pH 6 to 8, and a second biological treatment process for reducing the amount of sludge or an excess sludge treatment process is performed under an acidic condition of pH 5 to 6, the amount of sludge generated can be markedly reduced. The reason for this is as follows: When the second biological treatment process in which microorganisms coexist, or the excess sludge treatment process is performed at a pH in the range of 5 to 6, the predation by microorganisms of non-flocculated sludge and flocculated sludge obtained from the first biological treatment process for performing the BOD treatment can be efficiently performed. On the other hand, when the pH is in the range of 5 to 8, the proliferation of most of the microorganisms that perform the predation is not affected by the pH. Consequently, in the second biological treatment process or the excess sludge treatment process, the weight ratio of the microorganisms to the volatile suspended solids (VSS) can be increased to be a high concentration, 10% or higher.

According to a first aspect and a second aspect, in the first biological treatment process for the BOD treatment and the second biological treatment process for reducing the amount of sludge or the excess sludge treatment process, the environmental conditions are adjusted according to the individual functions. Thereby, the functions of both processes can be optimally demonstrated, and thus treatment efficiency can be increased and the amount of excess sludge generated can be reduced.

In the first aspect, the second biological treatment process may include a multistage treatment process including two or more stages, and the second biological treatment process may include a biological treatment performed at a pH in the range of 5 to 6 and a subsequent biological treatment performed at a pH 6 or more.

In the second aspect, the excess sludge treatment process may be a sludge return type biological treatment process in which solid-liquid separating means is provided in the latter stage of a biological treatment tank and sludge subjected to solid-liquid separation is returned to the biological treatment tank, or a fluidized-bed-type biological treatment process in which a carrier is added to the biological treatment tank.

In the first aspect and the second aspect, the second biological treatment process may be any of a sludge return-type biological treatment process in which solid-liquid separating means is provided in the latter stage of a biological treatment tank and sludge subjected to solid-liquid separation is returned to the biological treatment tank, a fluidized-bed-type biological treatment process in which a carrier is added to the biological treatment tank, and a membrane-separation-type biological treatment process. In addition, the first biological treatment process may be performed by means of a fluidized-bed-type biological treatment in which a carrier is added to the biological treatment tank, or a multistage treatment including two or more stages.

According to the processes for biological treatment of organic wastewater and apparatuses of the first and second aspects, in the multistage activated sludge process involving a predation effect caused by microorganisms, treatment efficiency can be further increased and the amount of excess sludge generated can be further reduced while a stable quality of the treated water is maintained.

The preferred embodiments of the first and second aspects will now be described in detail with reference to the drawings.

FIG. 1 is a flow diagram showing an embodiment of a process for biological treatment of organic wastewater according to the first aspect of the present invention. FIG. 2 is a flow diagram showing an embodiment of a process for biological treatment of organic wastewater according to the second aspect.

In the process shown in FIG. 1, raw water (organic wastewater) is first introduced into a first biological treatment tank (dispersed bacteria tank) 1, and at least 70%, preferably at least 80%, and more preferably at least 90% of the BOD (organic component) is subjected to oxidative decomposition by non-flocculating bacteria. The pH of the first biological treatment tank 1 is 6 or more, preferably in the range of pH 6 to 8. The BOD volume load in the first biological treatment tank 1 is 1 kg/m$^3$/d or more, for example, 1 to 20 kg/m$^3$/d, and the hydraulic retention time (HRT) is 24 hours or less, for example, 0.5 to 24 hours. In such a case, preferably, treated water in which the non-flocculating bacteria are dominant can be obtained, and by reducing the HRT, wastewater having a low BOD concentration can be treated at a high load. Furthermore, a high-load operation and a reduction in the retention time can be achieved by adding a carrier.

The treated water in the first biological treatment tank 1 is introduced into a second biological treatment tank (microorganism tank) 2 in which the pH is controlled in the range of 5 to 6, preferably in the range of 5 to 5.5. In this second biological treatment tank 2, the oxidative decomposition of the remaining organic component, the autolysis of the non-flocculating bacteria, and the predation by the microorganisms are performed, thereby reducing the amount of sludge.

In the process shown in FIG. 1, the second biological treatment tank 2 may have a multistage structure, and two or more biological treatment tanks may be provided in series.

In a biological treatment tank at the former stage, a treatment may be performed under a condition of pH 5 to 6, preferably pH 5 to 5.5. In another biological treatment tank at the latter stage, a treatment may be performed under a condition of pH 6 or more, preferably pH 6 to 8. According to such a multistage treatment, the predation of the sludge by microorganism can be efficiently performed in the biological treatment tank at the former stage, and the efficiency of the solid-liquid separation of the sludge can be increased and the quality of the treated water can be improved in the biological treatment tank at the latter stage.

The treated water in the second biological treatment tank 2 is subjected to solid-liquid separation in a sedimentation tank 3. The separated water is discharged as treated water outside the system. A part of the separated sludge is discharged as excess sludge outside the system, and the rest is returned to the first biological treatment tank 1 and the second biological treatment tank 2. This sludge return is performed in order to maintain the amount of sludge in each biological treatment tank. For example, when the first biological treatment tank 1 and/or the second biological treatment tank 2 is a carrier-containing fluidized-bed-type tank described below, the sludge return is not essential. When the BOD volume load of the first biological treatment tank 1 is low, the sludge may be returned to only the second biological treatment tank 2.

In the process shown in FIG. 2, raw water (organic wastewater) is sequentially introduced into a first biological treatment tank 1 and a second biological treatment tank 2 both of which are controlled so as to have a pH of 6 or more, preferably pH 6 to 8. As in the process shown in FIG. 1, at least 70%, preferably at least 80%, and more preferably at least 90% of the organic component is subjected to oxidative decomposition in the first biological treatment tank 1 by non-flocculating bacteria. Subsequently, in the second biological treatment tank 2, the oxidative decomposition of the remaining organic component, the autolysis of the non-flocculating bacteria, and the predation by the microorganisms are performed, thereby reducing the amount of sludge. The treated water in the second biological treatment tank 2 is subjected to solid-liquid separation in a sedimentation tank 3 and the separated water is discharged as treated water outside the system. At least a part of the sludge generated from the second biological treatment tank 2 (in FIG. 2, a part of the separated sludge in the sedimentation tank 3 into which the treated water in the second biological treatment tank 2 is introduced) is supplied to an excess sludge treatment tank 4 in which the pH is controlled in the range of 5 to 6, preferably 5 to 5.5, and is decomposed by aerobic digestion therein. The sludge treated in the excess sludge treatment tank 4 is returned to the first biological treatment tank 1 and/or the second biological treatment tank 2. In FIG. 2, among the rest of the separated sludge of the sedimentation tank 3, a part of the sludge is discharged as excess sludge outside the system and the rest is returned to the second biological treatment tank 2.

Among the separated sludge of the sedimentation tank 3, the ratio of the amount of sludge supplied to the excess sludge treatment tank 4 to the amount of sludge returned to the second biological treatment tank 2 is appropriately set according to the amount of sludge generated so as to maintain a suitable retention time in the excess sludge treatment tank described below. Among the treated sludge of the excess sludge treatment tank 4, the ratio of the amount of sludge returned to the first biological treatment tank 1 to that of sludge returned to the second biological treatment tank 2, or which biological treatment tank is selected for the treated sludge to return to is appropriately determined so as to maintain a constant amount of sludge contained in each biological treatment tank.

In the early stage of the operation of the apparatus or when the amount of sludge generated is high, all to half of the generated sludge may be charged to the excess sludge treatment tank 4. The excess sludge treatment tank 4 has not only an effect of reduction in the amount of sludge but also an effect of supplying the second biological treatment tank 2 with microorganisms.

The sludge retention time in the excess sludge treatment tank 4 is 6 hours or more, preferably 12 hours or more, for example, 12 to 240 hours. For example, by employing an aerobic treatment process in which a sedimentation tank 4B is provided and sludge is returned to an excess sludge treatment tank 4A, which is shown in FIG. 3, a fluidized bed in which a carrier is added, or a membrane-separation-type aerobic treatment process, the sludge retention time can be further increased. A carrier used in the first biological treatment tank, which is described below, can be used as the carrier in the excess sludge treatment tank 4.

In both processes shown in FIGS. 1 and 2, when a large amount of organic substance remains in the treated water of the first biological treatment tank 1, which is introduced into the second biological treatment tank 2, the oxidative decomposition of the organic substance is performed in the second biological treatment tank 2. It is known that when the oxidative decomposition of the organic substance by bacteria is performed in the second biological treatment tank 2 containing a large amount of microorganisms, the bacteria proliferate in a form that enables their escape from the microorganisms that perform predation. A group of bacteria thus proliferated are not preyed upon by the microorganisms, and thus the decomposition of the bacteria depends on only the autolysis thereof, resulting in a decrease in the effect of reduction in the amount of the sludge generated. Furthermore, according to the process of the present invention, the second biological treatment tank 2 or the excess sludge treatment tank 4 is set to an acidic condition. Consequently, when a large amount of organic substance remains, fungi and the like proliferate using the organic substance, which may result in bulking.

Consequently, as described above, it is necessary that most of the organic substances, i.e., at least 70%, preferably at least 80%, and more preferably at least 90% of the BOD in the raw water should be decomposed to convert it to bacteria in the first biological treatment tank 1. Accordingly, in view of the soluble BOD sludge load in the second biological treatment tank 2, the operation is preferably performed at a sludge load of 0.5 kg-BOD/kg-MLSS/d or less, for example, 0.01 to 0.1 kg-BOD/kg-MLSS/d.

The processes shown in FIGS. 1 and 2 show examples of the first and second aspects. The first and second aspects are not limited to the processes shown in the figures as long as the processes do not depart from the essence of the aspects.

In order to achieve a high-load treatment, a part of the separated sludge in the latter-stage sedimentation tank may be returned to the first biological treatment tank. Alternatively, for example, the first biological treatment tank may be a fluidized bed in which a carrier is added. Alternatively, as the first biological treatment tank, two or more biological treatment tanks may be provided in series so as to perform a multistage treatment. In particular, the addition of a carrier is preferred because it enables a high-load treatment at a BOD volume load of 5 kg/m$^3$/d or more. In this case, the added carrier may have any shape, for example, a spherical shape, pellets, a hollow cylindrical shape, or a filamentous shape, and may have a diameter of about 0.1 to 10 mm. Examples of the material of the carrier include, but are not limited to, natural materials, inorganic materials, and polymer materials. A gel substance may also be used.

Since the second biological treatment tank 2 uses the activity of microorganisms whose proliferation rate is lower than that of bacteria and the autolysis of the bacteria, it is important that suitable operating conditions and treatment apparatus are determined so that the microorganisms and the bacteria stay in the system. In order to achieve this, as shown in FIGS. 1 and 2, the second biological treatment tank preferably performs a sludge return-type biological treatment in which the sludge is returned. Alternatively, as described in an example below, preferably, a separation membrane is immersed in the tank to perform a membrane-separation-type activated sludge treatment.

An addition of a carrier to the aerating tank can increase the amount of the microorganisms kept in the tank. In this case, the same carriers as those added to the first biological treatment tank can be used as the carrier.

EXAMPLES AND COMPARATIVE EXAMPLES OF THE FIRST AND SECOND ASPECTS

The first and second aspects will now be described more specifically by way of examples and comparative examples.

Example 1

As shown in FIG. 4a, a treatment of organic wastewater (BOD 630 mg/L) was performed using an experimental apparatus in which an activated sludge tank (not including a sludge return) with a volume of 3.6 L serving as a first biological treatment tank 11 was connected to an immersion-membrane-type activated sludge tank with a volume of 15 L serving as a second biological treatment tank 12. An immersion membrane 12a was provided in the second biological treatment tank 12, and water permeated through the immersion membrane was taken out as treated water.

The pH of the first biological treatment tank 11 was adjusted to 6.8 and the pH of the second biological treatment tank 12 was adjusted to 5.0.

Table 1 shows the results four months after the initiation of the experiment. FIG. 5 shows the relationship between the charged BOD and the amount of generated excess sludge (sludge conversion ratio).

In this example, the operation was performed under the following conditions: In the first biological treatment tank 11, the soluble BOD volume load was 3.5 kg-BOD/m$^3$/d and the HRT was 4 hours. In the second biological treatment tank 12, the soluble BOD sludge load was 0.022 kg-BOD/kg-MLSS/d and the HRT was 17 hours. As a whole, the BOD volume load was 0.75 kg-BOD/m$^3$/d and the HRT was 21 hours. As a result, the sludge conversion ratio was 0.1 kg-MLSS/kg-BOD, and the BOD of the treated water was of the detection limit or lower.

Example 2

As shown in FIG. 4b, a treatment of organic wastewater (BOD 630 mg/L) was performed using an experimental apparatus in which an activated sludge tank (not including a sludge return) with a volume of 3.6 L serving as a first biological treatment tank 11, an immersion-membrane-type activated sludge tank with a volume of 15 L serving as a second biological treatment tank 12, and an excess sludge treatment tank 13 were connected to each other. As in the apparatus shown in FIG. 4a, an immersion membrane 12a was provided in the second biological treatment tank 12, and water permeated through the immersion membrane 12a was taken out as treated water.

The pH of the first biological treatment tank 11 and that of the second biological treatment tank 12 were adjusted to 6.8, and the pH of the excess sludge treatment tank 13 was adjusted to 5.0. The sludge in the second biological treatment tank 12 was drained at a rate of 0.5 L/d and was introduced into the excess sludge treatment tank 13. The sludge in the excess sludge treatment tank 13 was drained at a rate of 0.5 L/d and was returned to the second biological treatment tank 12. The retention time in the excess sludge treatment tank 13 was sludge retention time (SRT)=HRT=10 days.

Table 1 shows the results four months after the initiation of the experiment. FIG. 5 shows the relationship between the charged BOD and the amount of generated excess sludge (sludge conversion ratio).

In this example, the operation was performed under the following conditions: In the first biological treatment tank 11, the soluble BOD volume load was 3.85 kg-BOD/m$^3$/d and the HRT was 4 hours. In the second biological treatment tank 12, the soluble BOD sludge load was 0.022 kg-BOD/kg-MLSS/d and the HRT was 17 hours. As a whole, the BOD volume load was 0.75 kg-BOD/m$^3$/d and the HRT was 21 hours. As a result, the sludge conversion ratio was 0.11 kg-MLSS/kg-BOD, and the BOD of the treated water was of the detection limit or lower.

Comparative Example 1

A treatment of organic wastewater (BOD 630 mg/L) was performed as in Example 1 except that an experimental apparatus that did not include the first biological treatment tank and that included only the immersion-membrane-type activated sludge tank with a volume of 15 L serving as the second biological treatment tank was used. Table 1 shows the results four months after the initiation of the experiment. FIG. 5 shows the relationship between the charged BOD and the amount of generated excess sludge (sludge conversion ratio).

In this comparative example, the operation was performed under a condition of a soluble BOD volume load of 0.76 kg-BOD/m$^3$/d and an HRT of 20 hours. As a result, as shown in Table 1, although the quality of the treated water was satisfactory, the sludge conversion ratio was 0.40 kg-MLSS/kg-BOD.

Comparative Example 2

A treatment of organic wastewater (BOD 630 mg/L) was performed as in Example 1 except that both the pH of the first biological treatment tank and the pH of the second biological treatment tank were adjusted to 6.8. Table 1 shows the results four months after the initiation of the experiment. FIG. 5 shows the relationship between the charged BOD and the amount of generated excess sludge (sludge conversion ratio).

In this comparative example, the operation was performed under the following conditions: In the first biological treatment tank 11, the soluble BOD volume load was 3.85 kg-BOD/m$^3$/d and the HRT was 4 hours. In the second biological treatment tank 12, the soluble BOD sludge load was 0.022 kg-BOD/kg-MLSS/d and the HRT was 17 hours. As a whole, the BOD volume load was 0.75 kg-BOD/m$^3$/d and the HRT was 21 hours. As a result, as shown in Table 1, although the quality of the treated water was satisfactory, the sludge conversion ratio was 0.2 kg-MLSS/kg-BOD.

TABLE 1

| | Raw water | | First biological treatment tank | BOD in treated water (mg/L) | Second biological treatment tank | | |
|---|---|---|---|---|---|---|---|
| Examples | BOD (mg/L) | Flow rate (L/d) | BOD volume load (kg-BOD/m³/d) | | Content of microorganisms (%-VSS) | MLSS (mg/L) | BOD in treated water (mg/L) |
| Example 1 | 630 | 22 | 3.85 | 73 | 60 | 4000 | Detection limit or lower |
| Example 2 | 630 | 22 | 3.85 | 72 | 55 | 5000 | Detection limit or lower |
| Comparative Example 1 | 630 | 18 | — | — | 5 | 4500 | Detection limit or lower |
| Comparative Example 2 | 630 | 22 | 3.85 | 74 | 25 | 5000 | Detection limit or lower |

The results of Examples 1 and 2 and Comparative Examples 1 and 2 showed the following.

In Comparative Example 1, a known activated sludge process was performed. In Comparative Example 2, a multistage biological treatment process that did not include a biological treatment process under an acidic condition was performed. In the known activated sludge process (Comparative Example 1), the sludge conversion ratio was 0.40 kg-MLSS/kg-BOD. By introducing the multistage biological treatment as in Comparative Example 2, the sludge conversion ratio was 0.20 kg-MLSS/kg-BOD, thus reducing the amount of sludge generated to ½. This reduction in the amount of sludge was about the same level as that in multistage biological treatment processes that have been reported to date.

In contrast, in Examples 1 and 2 of the present invention, in which a biological treatment process under an acidic condition was introduced, the sludge conversion ratios were 0.10 and 0.11 kg-MLSS/kg-BOD, respectively. Thus, the amount of sludge generated could be reduced to ¼ of that in the known activated sludge process, and could be reduced to ½ of that of the known multistage biological treatment process.

[Third and Fourth Aspects]

In a third aspect, organic substances are removed in a first biological treatment process (dispersed bacteria tank), the predation of the dispersed bacteria from the first biological treatment tank is performed in a second biological treatment process (animalcule tank), and the sludge from the second biological treatment tank is solubilized, subjected to organic oxidation, and modified by the activity of anaerobic bacteria under anaerobic conditions to again transform it into dispersed bacteria and/or to again provide it as a prey for the animalcules. Thereby, treatment efficiency can be increased and the amount of excess sludge generated can be reduced.

In a fourth aspect, an aerobic treatment process is performed prior to the anaerobic treatment process. In this case, the content of animalcules in the sludge is increased, and thus the sludge is solubilized in the anaerobic treatment process at the latter stage.

Therefore, according to the processes for biological treatment of organic wastewater of the third and fourth aspects, in a multistage activated sludge process involving a predation effect caused by animalcules, treatment efficiency can be further increased and the amount of excess sludge generated can be further reduced while a stable quality of the treated water is maintained.

The preferred embodiments of the third and fourth aspects will now be described in detail with reference to the drawings.

Figure 6:
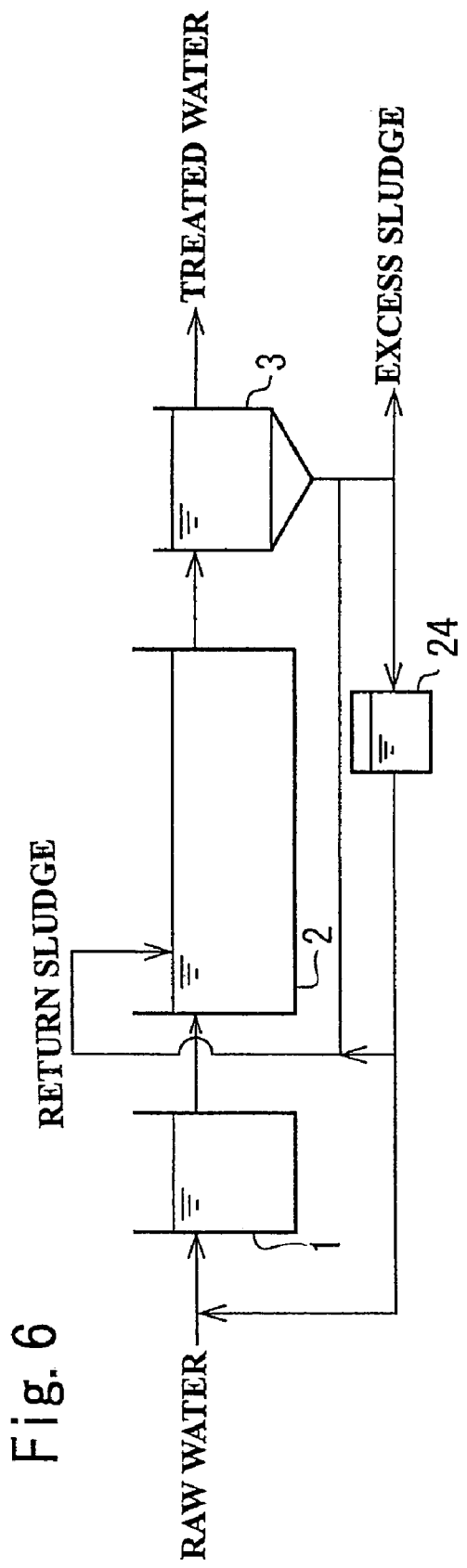
FIG. 6 is a flow diagram showing an embodiment of a process for biological treatment of organic wastewater according to a third aspect.
Figure 7:
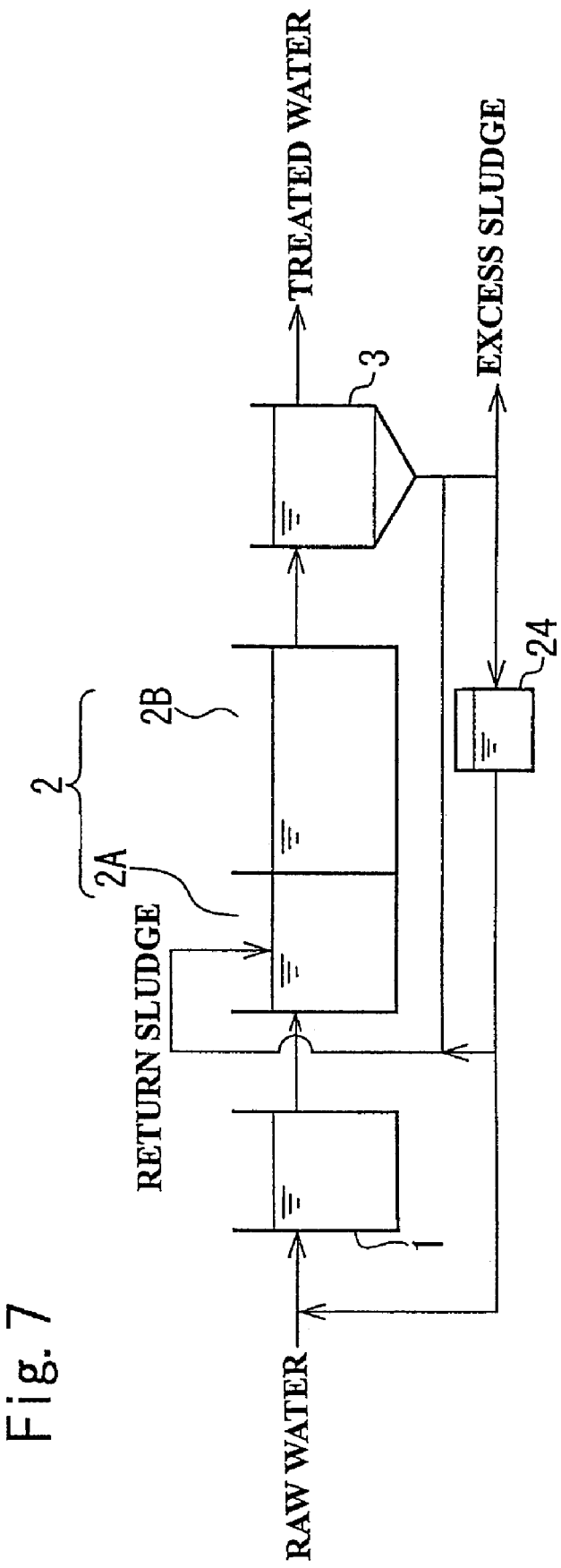
FIG. 7 is a flow diagram showing another embodiment of the process for biological treatment of organic wastewater according to the third aspect.
Figure 8:
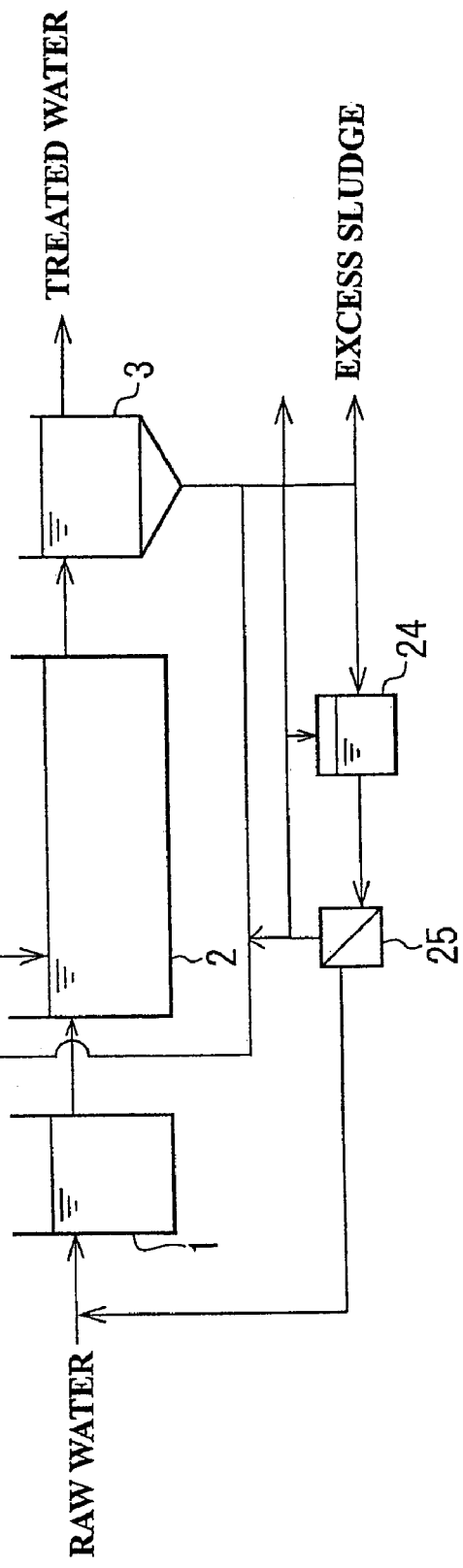
FIG. 8 is a flow diagram showing another embodiment of the process for biological treatment of organic wastewater according to the third aspect.
Figure 9:
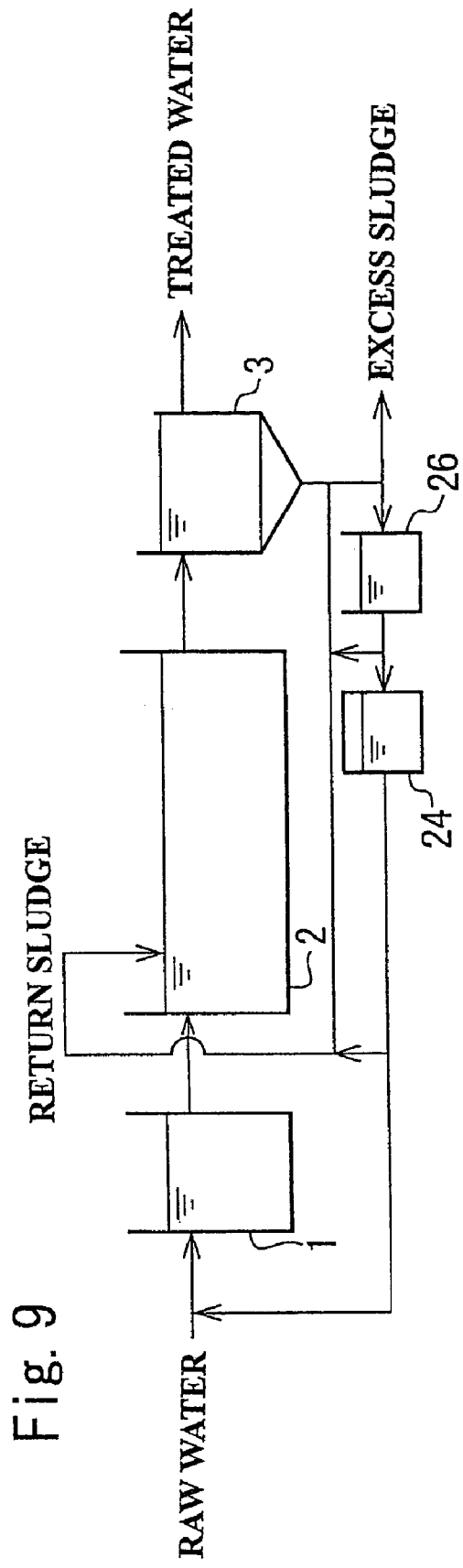
FIG. 9 is a flow diagram showing an embodiment of a process for biological treatment of organic wastewater according to a fourth aspect.
Figure 10:
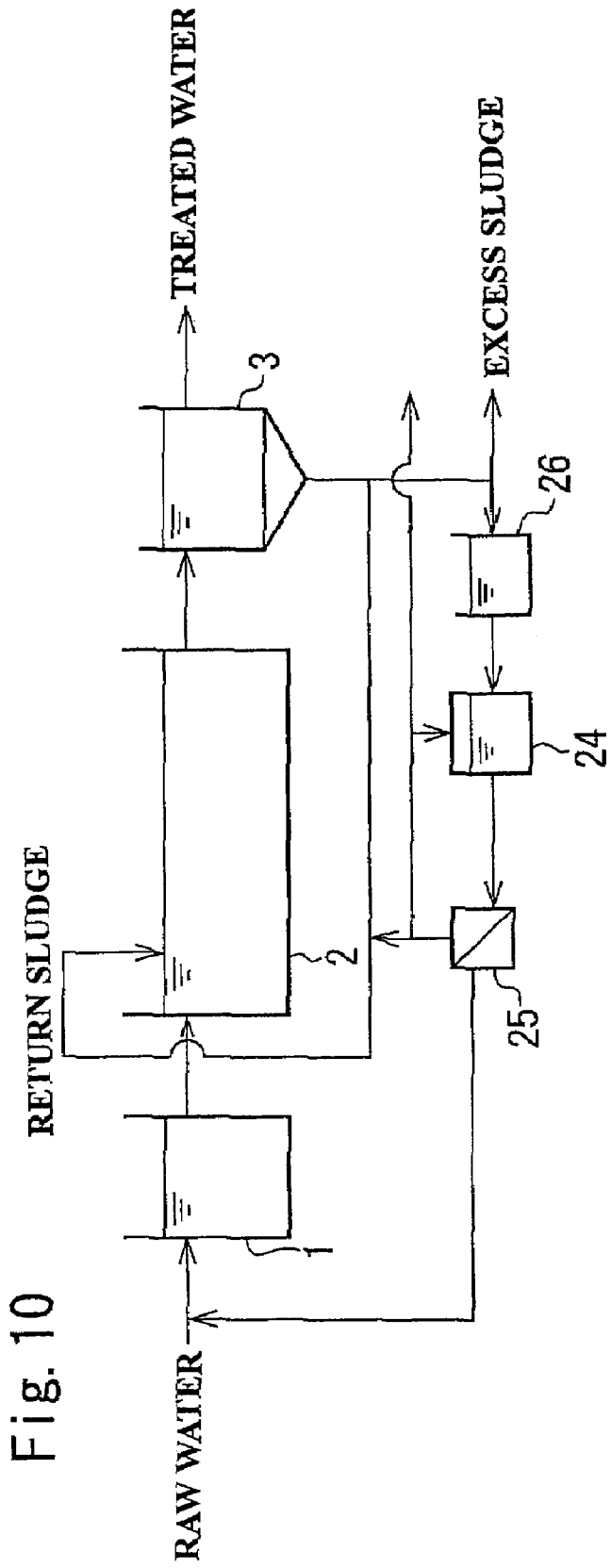
FIG. 10 is a flow diagram showing another embodiment of the process for biological treatment of organic wastewater according to the fourth aspect.

FIGS. 6 to 8 are flow diagrams each showing an embodiment of a process for biological treatment of organic wastewater and an apparatus therefor according to the third aspect of the present invention. FIGS. 9 and 10 are flow diagrams each showing an embodiment of a process for biological treatment of organic wastewater according to the fourth aspect. In FIGS. 6 to 10, members having the same function are assigned the same reference numerals.

In the process and the apparatus shown in FIG. 6, raw water (organic wastewater) is first introduced into a first biological treatment tank (dispersed bacteria tank) 1, and at least 70%, preferably at least 80%, and more preferably at least 90% of the BOD (organic component) is subjected to oxidative decomposition by non-flocculating bacteria. The pH of the first biological treatment tank 1 is 6 or more, preferably in the range of pH 6 to 8. The BOD volume load in the first biological treatment tank 1 is 1 kg/m³/d or more, for example, 1 to 20 kg/m³/d, and the hydraulic retention time (HRT) is 24 hours or less, for example, 0.5 to 24 hours. In such a case, preferably, treated water in which the non-flocculating bacteria are dominant can be obtained, and by reducing the HRT, wastewater having a low BOD concentration can be treated at a high load. Furthermore, a high-load operation and a reduction in the retention time can be achieved by adding a carrier.

The treated water in the first biological treatment tank 1 is introduced into a second biological treatment tank (animalcule tank) 2 in which the pH is controlled to 6 or more, preferably in the range of 6 to 8. In this second biological treatment tank 2, the oxidative decomposition of the remaining organic component, the autolysis of the non-flocculating bacteria, and the predation by the animalcules are performed, thereby reducing the amount of sludge.

Since the second biological treatment tank 2 uses the activity of animalcules whose proliferation rate is lower than that of bacteria and the autolysis of the bacteria, suitable operating conditions and treatment apparatus must be used so that the animalcules and the bacteria stay in the system. In order to achieve this, in the second biological treatment tank 2, an activated sludge process in which the sludge is returned or a membrane-separation-type activated sludge process is preferably employed. More preferably, the amount of the animalcules kept in the tank can be increased by adding a carrier to the aerating tank.

Alternatively, as shown in FIG. 7, in the process shown in FIG. 6, the second biological treatment tank 2 may have a multistage structure, and two or more biological treatment tanks 2A and 2B may be provided in series. In the former stage treatment tank 2A, a treatment may be performed under a condition of pH 5 to 6, preferably pH 5 to 5.5, and in the latter stage treatment tank 2B, a treatment may be performed under a condition of pH 6 or more, preferably pH 6 to 8. According to such a multistage treatment, the predation of the sludge by animalcules can be efficiently performed in the former stage treatment tank 2A, and the efficiency of the solid-liquid separation of the sludge can be increased and the quality of the treated water can be improved in the latter stage treatment tank 2B. The process shown in FIG. 7 only differs from the process shown in FIG. 6 in that the second biological treatment tank 2 in FIG. 6 has a multistage structure and other structures are the same as those in FIG. 6. Additionally, in order to reduce the amount of sludge generated in the second biological treatment tank 2, the pH of the second biological treatment tank 2 composed of a single tank shown in FIG. 6 may be set to 6 or less without providing a partition shown in FIG. 7. In this case, however, neutralization is necessary before the treated water is released.

The treated water in the second biological treatment tank 2 is subjected to solid-liquid separation in a sedimentation tank 3. The separated water is discharged as treated water outside the system. A part of the separated sludge is discharged as excess sludge outside the system, a part of the separated sludge is returned to the second biological treatment tank 2, and the rest is supplied to an anaerobic digestion tank 24. The ratio of the separated sludge returned to the second biological treatment tank 2 to that returned to the anaerobic digestion tank 24 can be arbitrarily changed according to the amount of the sludge generated as long as the sludge retention time in the anaerobic digestion tank 24 described below can be maintained.

In the third aspect, at least a part of the sludge in the second biological treatment tank 2 in which animalcules prey upon the dispersed bacteria or sludge obtained by performing solid-liquid separation of sludge in the second biological treatment tank 2 is introduced into the anaerobic digestion tank 24 to perform solubilization, organic oxidation producing lower organic acids and lower alcohols, and modification of the sludge under anaerobic conditions. Therefore, instead of the separated sludge in the sedimentation tank 3, sludge drained from the second biological treatment tank 2 may be introduced into the anaerobic digestion tank 24.

The sludge in the second biological treatment tank 2 has a high content of animalcules, and the content of the animalcules is at least 5% of suspended solids (SS) and 30% or more thereof under some operating conditions. The animalcules easily die and are easily solubilized and subjected to organic oxidation by acid-producing bacteria under anaerobic conditions as compared with bacteria. Therefore, it is sufficient that the sludge retention time (SRT) in the anaerobic digestion tank 24 is 0.5 days or more, for example, 0.5 to 5 days. In order to prevent organic acids and alcohols produced in the anaerobic digestion tank 24 from being converted to methane by the activity of methane-producing bacteria, in the anaerobic digestion tank 24, the pH is preferably controlled to 6.0 or less, more preferably 5.5 or less, for example in the range of 5 to 5.5, or the temperature is preferably controlled to 30° C. or lower, more preferably 25° C. or lower, for example, 20° C. to 25° C. However, when the organic substance that is converted to organic acids and alcohols is converted to methane to recover it as energy or to dispose of, the pH of the anaerobic digestion tank 24 may be 6.0 or more, or the temperature thereof may be 30° C. or higher. By the anaerobic digestion in this anaerobic digestion tank 24, the animalcules in the second biological treatment tank 2 and the bacteria that are not preyed upon but remain are converted to organic acids and alcohols. Furthermore, components that are not decreased in the second biological treatment tank 2, that is, other SS components such as the feces and corpses of the animalcules, and bacteria, are also modified or broken down, and converted to bacterial cells of anaerobic bacteria in the anaerobic digestion tank 24. Thus, these components are converted to substances that can be preyed upon by the animalcules.

In FIGS. 6 and 7, the product treated in the anaerobic digestion tank 24 is returned to the first biological treatment tank 1 and/or the second biological treatment tank 2 without further treatment.

As shown in FIG. 8, the product treated in the anaerobic digestion tank 24 may be subjected to solid-liquid separation using a solid-liquid separation unit 25 such as a condenser or a dehydrator. The separated water (anaerobic treatment water) containing organic acids and alcohols may be returned to the first biological treatment tank 1 so as to again convert it to dispersed bacteria, and the solid content (sludge) may be returned to the second biological treatment tank 2 so as to be preyed upon by the animalcules. Thus, the amount of sludge can be further reduced. In this case, excess sludge may be drained from the sedimentation tank 3. Alternatively, excess sludge may be drained from the solid-liquid separation unit 25 disposed at the latter stage of the anaerobic digestion tank 24. All the solid content obtained by the solid-liquid separation in the solid-liquid separation unit 25 need not be returned to the second biological treatment tank 2, and a part of the solid content may be returned to the anaerobic digestion tank 24 again. Thus, high-concentration anaerobic digestion can be performed in the anaerobic digestion tank 24, thereby increasing the SRT and accelerating the solubilization. Alternatively, the solid-liquid separation or the high-concentration anaerobic digestion can be performed by providing an immersion membrane in the anaerobic digestion tank 24 or adding a carrier to the anaerobic digestion tank 24 without providing the solid-liquid separation unit such as a condenser.

A process shown in FIG. 9 differs from the process shown in FIG. 6 in that an aerobic digestion tank 26 is provided at the former stage of the anaerobic digestion tank 24. The treatments in the first biological treatment tank 1, the second biological treatment tank 2, the sedimentation tank 3, and the anaerobic digestion tank 24 are performed in the same way.

In the fourth aspect, at least a part of the sludge in the second biological treatment tank 2 or sludge obtained by performing solid-liquid separation of sludge in the second biological treatment tank 2 is introduced into the aerobic digestion tank 26 to perform aerobic digestion under a condition of pH 6 or less, preferably pH 5 to 5.5. At least a part of the treated sludge and the treated water are supplied to the anaerobic digestion tank 24 and are subjected to solubilization, organic oxidation, and modification under anaerobic conditions. In this case, the ratio of the separated sludge returned to the aerobic digestion tank 26 to that returned to the second biological treatment tank 2 can be arbitrarily changed according to the amount of sludge generated as long as the sludge retention time in the aerobic digestion tank 26 described below can be maintained.

In FIG. 9, the presence of the aerobic digestion tank 26 is advantageous in that not only does it provide the effect of reduction in the amount of sludge, but also, by passing through this aerobic digestion tank 26, the content of the animalcules in the sludge is further increased, and thus the solubilization of the sludge in the anaerobic digestion tank 24 at the latter stage can be easily performed. The sludge retention time in the aerobic digestion tank 26 is 12 hours or more, preferably 24 hours or more, for example, in the range of 24 to 240 hours. By employing an aerobic treatment process in which a solid-liquid separation unit is provided to return the sludge, a fluidized bed in which a carrier is added, or a membrane-separation-type aerobic treatment process, the sludge retention time can be further increased. A part of the sludge from the aerobic digestion tank 26 may be directly returned to the second biological treatment tank 2 without passing through the anaerobic digestion tank 24. In such a case, this process serves for replenishing the second biological treatment tank 2 with the animalcules.

A process shown in FIG. 10 differs from the process shown in FIG. 9 in that a solid-liquid separation unit 25 is provided at the latter stage of the anaerobic digestion tank 24, as shown in FIG. 8. In the solid-liquid separation unit 25, solid-liquid separation of the product treated in the anaerobic digestion tank 24 is performed and the separated water and the separated sludge are returned as in the process shown in FIG. 8. The separated sludge in the solid-liquid separation unit 25 may be further returned to the aerobic digestion tank 26.

The processes shown in FIGS. 6 to 10 show examples of the third and fourth aspects. The third and fourth aspects are not limited to the processes shown in the figures as long as the processes do not depart from the essence of the aspects.

In order to achieve a high-load treatment, a part of the separated sludge in the latter-stage sedimentation tank may be returned to the first biological treatment tank. Alternatively, for example, the first biological treatment tank may be a fluidized bed in which a carrier is added. Alternatively, as the first biological treatment tank, two or more biological treatment tanks may be provided in series so as to perform a multistage treatment. In particular, the addition of a carrier is preferred because it enables a high-load treatment at a BOD volume load of 5 kg/m$^3$/d or more. In this case, the added carrier may have any shape, for example, a spherical shape, pellets, a hollow cylindrical shape, or a filamentous shape, and may have a diameter of about 0.1 to 10 mm. Examples of the material of the carrier include, but are not limited to, natural materials, inorganic materials, and polymer materials. A gel substance may also be used. Since the second biological treatment tank 2 uses the activity of animalcules whose proliferation rate is lower than that of bacteria and the autolysis of the bacteria, it is important that suitable operating conditions and treatment apparatus are determined so that the animalcules and the bacteria stay in the system. In order to achieve this as shown in FIGS. 6 to 10, the second biological treatment tank performs a sludge return-type biological treatment in which the sludge is returned. Alternatively, preferably, a separation membrane is immersed in the tank to perform a membrane-separation-type activated sludge treatment. More preferably, an addition of a carrier to the aerating tank can increase the amount of the animalcules kept in the tank. In this case, the same carriers as those added to the first biological treatment tank can be used as the carrier.

In the wastewater treatment, in addition to the sludge derived from biological treatment, sludge is also generated from a primary sedimentation tank, a floatation tank, and the like. When the sludge is subjected to anaerobic treatment, the sludge is easily decomposed compared with the sludge derived from the biological treatment. Therefore, 50% or more of the sludge can be solubilized and converted to organic acids. In addition, components that are not solubilized are also broken down, and thus such components can be preyed upon by animalcules. Accordingly, in the third and fourth aspects, primary sedimentation sludge and floatation sludge may be added to the anaerobic treatment process (anaerobic digestion tank) in which the sludge of the second biological treatment tank is introduced. In such a case, SS components that are not solubilized are preyed upon by animalcules, and thus the amount of excess sludge discharged from a whole plant can be reduced.

EXAMPLES AND COMPARATIVE EXAMPLES OF THE THIRD AND FOURTH ASPECTS

The third and fourth aspects will now be described more specifically by way of examples and comparative examples.

Example 3

As shown in FIG. 6, a treatment of organic wastewater (BOD 630 mg/L) according to the present invention was performed using an experimental apparatus in which a first biological treatment tank (activated sludge tank (without sludge return)) 1 with a volume of 3.6 L, a second biological treatment tank (activated sludge tank) 2 with a volume of 15 L, a sedimentation tank 3, and an anaerobic digestion tank 24 with a volume of 1 L were connected to each other. The pH of the first biological treatment tank 1 was adjusted to 6.8, the pH of the second biological treatment tank 2 was adjusted to 6.8, and the pH of the anaerobic digestion tank 24 was adjusted to 6.0. The operation was performed under the following conditions: In the first biological treatment tank 1, the soluble BOD volume load was 3.85 kg-BOD/m$^3$/d and the HRT was 4 hours. In the second biological treatment tank 2, the soluble BOD sludge load was 0.022 kg-BOD/kg-MLSS/d and the HRT was 17 hours. As a whole, the BOD volume load was 0.75 kg-BOD/m$^3$/d and the HRT was 21 hours.

The concentration of the SS in the second biological treatment tank 2 was 5,000 mg/L and that in the sludge drained from the sedimentation tank 3 was 10,000 mg/L. This concentrated sludge was drained at a rate of 250 mL/d and was added to the anaerobic digestion tank 24. In addition, the concentrated sludge was discharged outside the system at a rate of 250 mL/d as excess sludge and the rest of the sludge was returned to the second biological treatment tank 2. The HRT and the SRT of the anaerobic digestion tank 24 were set to four days. The sludge treated in the anaerobic digestion tank 24 was returned to the second biological treatment tank 2.

The operation was continuously performed under the above conditions for four months. As a result, the soluble BOD concentration in the treated water of the anaerobic digestion tank 24 was 4,000 mg-BOD/L, and acetic acid accounted for 55% and propionic acid accounted for 40% of the soluble BOD. The sludge conversion ratio calculated from the amount of sludge drained from the second biological treatment tank 2 was 0.12 kg-MLSS/kg-BOD.

Example 4

As shown in FIG. 7, a treatment of organic wastewater (BOD 630 mg/L) was performed as in Example 3 using the same experimental apparatus as in Example 3 except that the second biological treatment tank 2 was a two-stage activated sludge tank (5 L+10 L) including a former stage treatment tank 2A with a volume of 5 L and a latter stage treatment tank 2B with a volume of 10 L. The pH of the former stage treatment tank was adjusted to 5.0 and the pH of the latter stage treatment tank was adjusted to 6.8. Other conditions were the same as those in Example 3.

The concentration of the SS in the second biological treatment tank 2 was 5,000 mg/L and that in the sludge drained from the sedimentation tank 3 was 10,000 mg/L. The concentrated sludge was drained at a rate of 250 mL/d and was added to the anaerobic digestion tank 24. In addition, the concentrated sludge was discharged outside the system at a rate of 208 mL/d as excess sludge and the rest of the sludge was returned to the second biological treatment tank 2. The HRT and the SRT of the anaerobic digestion tank 24 were set to four days. The sludge treated in the anaerobic digestion tank 24 was returned to the second biological treatment tank 2.

The operation was continuously performed under the above conditions for four months. As a result, the soluble BOD concentration in the treated water of the anaerobic digestion tank 24 was 6,500 mg-BOD/L, and acetic acid accounted for 55% and propionic acid accounted for 35% of the soluble BOD. The sludge conversion ratio calculated from the amount of sludge drained from the second biological treatment tank 2 was 0.10 kg-MLSS/kg-BOD.

Example 5

As shown in FIG. 9, a treatment of organic wastewater (BOD 630 mg/L) was performed as in Example 3 using the same experimental apparatus as in Example 3 except that an aerobic digestion tank 26 with a volume of 2 L was provided at the former stage of the anaerobic digestion tank 24. The pH of the aerobic digestion tank was adjusted to 5.0. Other conditions were the same as those in Example 3.

The concentration of the SS in the second biological treatment tank 2 was 5,000 mg/L and that in the sludge drained from the sedimentation tank 3 was 10,000 mg/L. This concentrated sludge was added to the aerobic digestion tank 26 at a rate of 250 mL/d, and the sludge was drained from the aerobic digestion tank 26 at the same rate and was added to the anaerobic digestion tank 24. The rest of the concentrated sludge was returned to the second biological treatment tank 2. The HRT and the SRT of the aerobic digestion tank 26 were set to eight days. The HRT and the SRT of the anaerobic digestion tank 24 were set to four days. The sludge treated in the anaerobic digestion tank 24 was returned to the second biological treatment tank 2.

The operation was continuously performed under the above conditions for four months. As a result, the soluble BOD concentration in the treated water of the anaerobic digestion tank 24 was 6,500 mg-BOD/L, and acetic acid accounted for 55% and propionic acid accounted for 35% of the soluble BOD. The sludge conversion ratio calculated from the amount of sludge (185 mL/d) drained from the second biological treatment tank 2 was 0.09 kg-MLSS/kg-BOD.

Example 6

As shown in FIG. 8, a treatment of organic wastewater (BOD 630 mg/L) was performed as in Example 3 using the same experimental apparatus as in Example 3 except that a solid-liquid separation unit 25 was provided at the latter stage of the anaerobic digestion tank 24. The pH condition, the load condition, and the like of each tank were the same as those in Example 3.

The concentration of the SS in the second biological treatment tank 2 was 5,000 mg/L and that in the sludge drained from the sedimentation tank 3 was 10,000 mg/L. The concentrated sludge was added to the anaerobic digestion tank 24 at a rate of 250 mL/d, and the rest of the concentrated sludge was returned to the second biological treatment tank 2. Thereby, the concentrations of the SS in the first and second biological treatment tanks 1 and 2 could be kept constant without draining the sludge from the tanks. The HRT in the anaerobic digestion tank 24 was set to four days. The product treated in the anaerobic digestion tank 24 was subjected to solid-liquid separation in the solid-liquid separation unit 25. The treated water was returned to the first biological treatment tank 1, ½ of the separated sludge was returned to the second biological treatment tank 2, ¼ of the separated sludge was returned to the anaerobic digestion tank 24, and ¼ of the separated sludge was drained as excess sludge.

The operation was continuously performed under the above conditions for four months. As a result, the soluble BOD concentration in the treated water of the anaerobic digestion tank 24 was 4,000 mg-BOD/L, and acetic acid accounted for 55% and propionic acid accounted for 40% of the soluble BOD. The sludge conversion ratio calculated from the amount of sludge drained from the anaerobic digestion tank 24 was 0.10 kg-MLSS/kg-BOD.

Example 7

As shown in FIG. 10, a treatment of organic wastewater (BOD 630 mg/L) was performed as in Example 6 using the same experimental apparatus as in Example 6 except that an aerobic digestion tank 26 with a volume of 2 L was provided at the former stage of the anaerobic digestion tank 24. The pH of the aerobic digestion tank 26 was adjusted to 5.0. Other conditions were the same as those in Example 6.

Each of the concentrations of the SS in the first and second biological treatment tanks 1 and 2 was 5,000 mg/L and that in the sludge drained from the sedimentation tank 3 was 10,000 mg/L. The concentrated sludge was added to the aerobic digestion tank 26 at a rate of 250 mL/d, the sludge was drained from the aerobic digestion tank 26 at the same rate and was added to the anaerobic digestion tank 24, and the rest of the concentrated sludge was returned to the second biological treatment tank 2. Thereby, the concentrations of the SS in the first and second biological treatment tanks 1 and 2 could be kept constant without draining the sludge from the tanks. The HRT and the SRT of the aerobic digestion tank 26 were set to eight days. The HRT in the anaerobic digestion tank 24 was set to four days. The sludge treated in the anaerobic digestion tank 24 was subjected to solid-liquid separation in the solid-liquid separation unit 25. The treated water was returned to the first biological treatment tank 1, ½ of the solid content was returned to the second biological treatment tank 2, ⅜ of the rest was returned to the anaerobic digestion tank 24, and ⅛ of the rest was drained as excess sludge.

The operation was continuously performed under the above conditions for four months. As a result, the soluble BOD concentration in the treated water of an anaerobic digestion tank 24 was 6,500 mg-BOD/L, and acetic acid accounted for 55% and propionic acid accounted for 35% of the soluble BOD. The sludge conversion ratio calculated from the amount of sludge drained from the anaerobic digestion tank 24 was 0.07 kg-MLSS/kg-BOD.

Comparative Example 3

Figure 11:
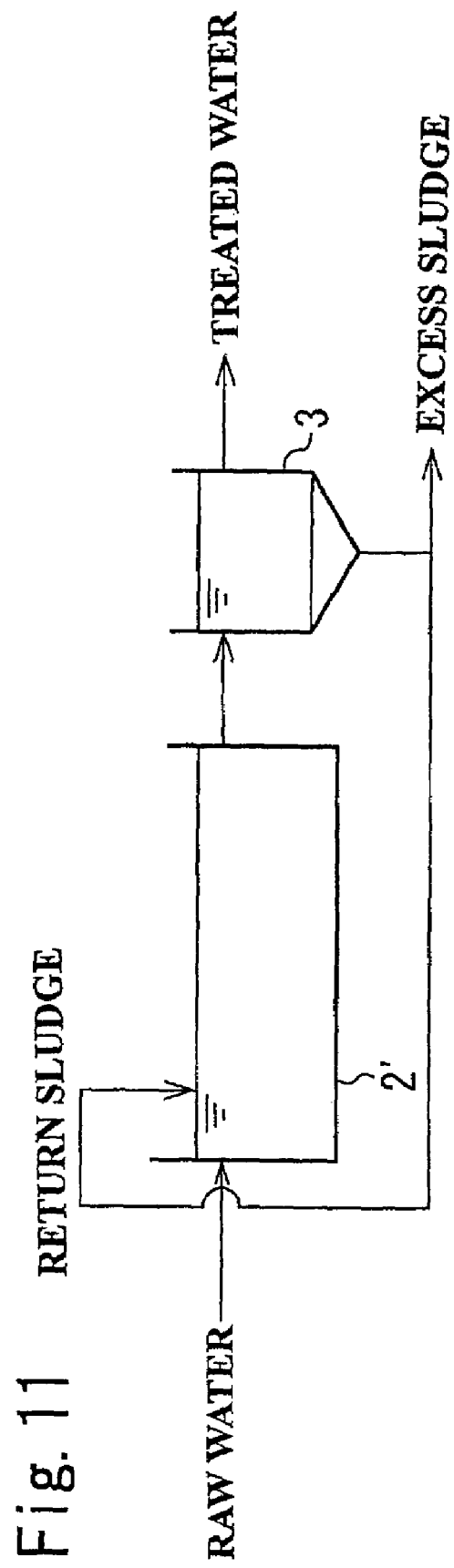
FIG. 11 is a flow diagram showing an experimental apparatus used in Comparative Examples 3 and 5.

As shown in FIG. 11, a treatment of organic wastewater (BOD 630 mg/L) was performed using an experimental apparatus including a biological treatment tank (activated sludge tank) 2' with a volume of 15 L and a sedimentation tank 3. In the biological treatment tank 2', the soluble BOD volume load was 0.76 kg-BOD/m$^3$/d, the HRT was 20 hours, and the pH was adjusted to 6.8. The operation was continuously performed under the above conditions for four months. As a result, the treated water was satisfactory, but the sludge conversion ratio was 0.40 kg-MLSS/kg-BOD.

Comparative Example 4

Figure 12:
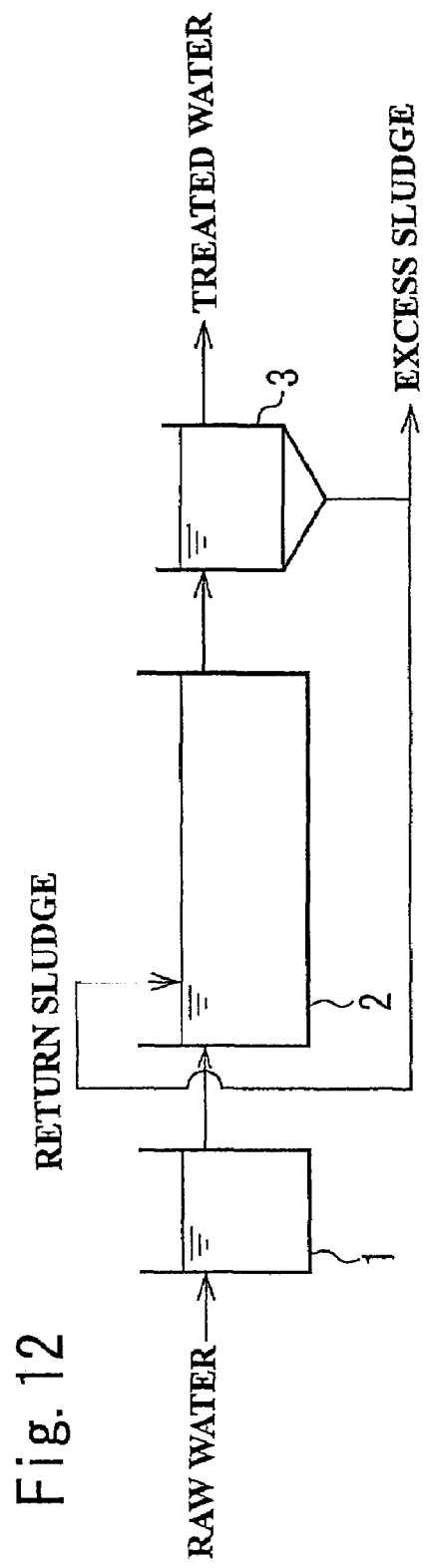
FIG. 12 is a flow diagram showing an experimental apparatus used in Comparative Examples 4 and 6.

As shown in FIG. 12, a treatment of organic wastewater (BOD 630 mg/L) was performed as in Example 3 using the same experimental apparatus as in Example 3 except that the anaerobic digestion tank 24 was not provided. The pH condition, the load condition, and the like of each tank were the same as those in Example 3.

The operation was continuously performed under the above conditions for four months. As a result, the treated water was satisfactory, but the sludge conversion ratio calculated from the amount of sludge drained from the second biological treatment tank 2 was 0.20 kg-MLSS/kg-BOD. The ratio of animalcules to the VSS in the second biological treatment tank 2 was about 25% (w/w).

Figure 13:
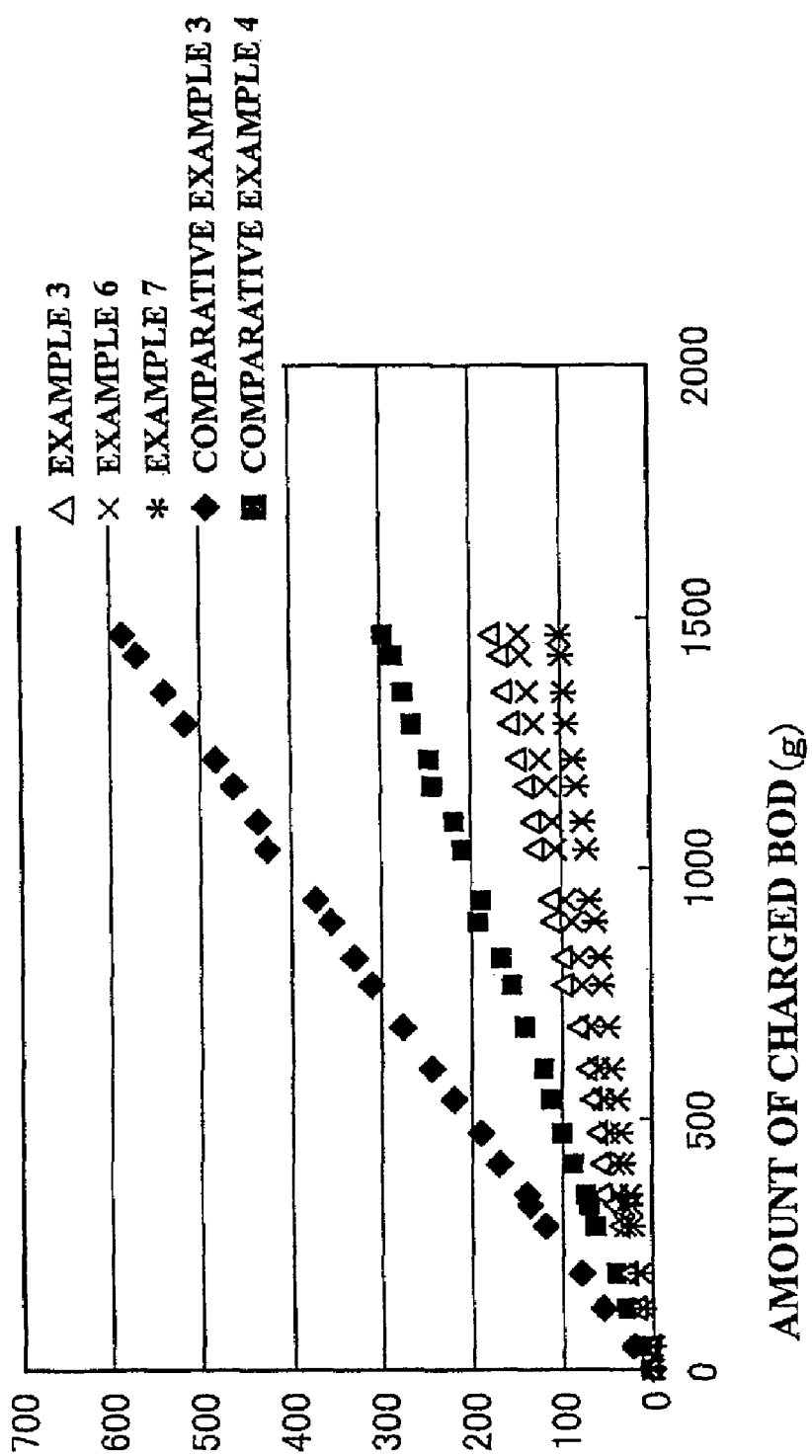
FIG. 13 is a graph showing the relationship between the amount of charged BOD and the amount of excess sludge generated in Examples 3, 6, and 7 and Comparative Examples 3 and 4.

FIG. 13 shows the relationship between the charged BOD and the amount of generated excess sludge (sludge conversion ratio) in Examples 3, 6, and 7 and Comparative Examples 3 and 4. Table 2 shows the operational status four months after the initiation of the experiments of Examples 6 and 7, and Comparative Examples 3 and 4.

cal treatment as in Comparative Example 4, the sludge conversion ratio was 0.20 kg-MLSS/kg-BOD, thus reducing the amount of sludge generated to ½. This reduction in the amount of sludge was about the same level as that in two-stage biological treatment processes that have been reported to date.

In contrast, in Example 7 of the present invention, in which the anaerobic digestion process was introduced and the reduction in the amount of sludge was particularly significant, the sludge conversion ratio was 0.07 kg-MLSS/kg-BOD. Thus, the amount of sludge generated could be reduced to ⅙ of that in the known process. The reason that the amount of sludge was significantly reduced in. Example 7 was as follows. The ratio of animalcules to the sludge VSS was 32% (w/w) in the second biological treatment tank 2, whereas the ratio was 60% at the maximum in the aerobic digestion tank because of the predation by the animalcules in the aerobic digestion tank in which the pH was set to 5. Sludge including a high content of animalcules was easily solubilized. Therefore, the solubilization ratio in the anaerobic digestion tank 24 in Examples 4, 5, and 7 reached 65%, resulting in a marked reduction in the amount of sludge compared with Examples 3 and 6 in which the solubilization ratio reached only 40% at the maximum (the ratio of animalcules to the sludge VSS charged in the anaerobic digestion tank 24 was 30% (w/w)). Furthermore, in Example 7, the sludge after the anaerobic digestion was subjected to solid-liquid separation and the soluble BOD component was again converted to dispersed bacteria in the first biological treatment tank 1. Thereby, in Example 7, the amount of sludge could be reduced to ⅙ of that in the known process.

[Fifth Aspect]

According to a process for biological treatment of organic wastewater and an apparatus of a fifth aspect, in a multistage activated sludge process involving a predation effect caused by animalcules, treatment efficiency can be further increased

TABLE 2

| | First biological treatment tank(3.6 L) | | | Second biological treatment tank(15 L) | | | |
|---|---|---|---|---|---|---|---|
| | Raw water | | BOD volume | Soluble BOD in outlet water | Content of animalcules | | BOD in treated |
| | BOD (mg/L) | Flow rate (L/d) | load (kg-BOD/m$^3$/d) | (mg/L) | (%-VSS) | MLSS (mg/L) | water (mg/L) |
| Example 6 | 630 (660)*1 | 22 (22.2)*1 | 3.85 (4.00)*1 | 72~76 | 30 | 4000 | Detection limit or lower |
| Example 7 | 630 (682)*1 | 22 (22.2)*1 | 3.85 (4.13)*1 | 75~78 | 32 (60)*2 | 5000 | Detection limit or lower |
| Comparative Example 3 | 630 | 18 | — | — | 5 | 4500 | Detection limit or lower |
| Comparative Example 4 | 630 | 22 | 3.85 | 70~79 | 25 | 5000 | Detection limit or lower |

*1: The values in parentheses are those in the case where water treated in the anaerobic digestion tank was combined with the water.
*2: The value in parentheses is that in the aerobic digestion tank.

The above results showed the following.

In Comparative Example 3, a known activated sludge process was performed. In Comparative Example 4, a known two-stage biological treatment process was performed. In the known activated sludge process (Comparative Example 3), the sludge conversion ratio was 0.40 kg-MLSS/kg-BOD. By introducing the multistage biologiand the amount of excess sludge generated can be further reduced while a stable quality of the treated water is maintained. Organic wastewater is introduced into a first biological treatment tank and most of the organic components (for example, 70% or more) are subjected to oxidative decomposition or converted to bacterial cells by bacteria. The liquid treated in the first biological treatment tank is introduced into a second biological treatment tank to perform oxidative decomposition of the remaining organic components, the autolysis of the bacteria, and the predation by animalcules, thereby reducing the amount of sludge.

The liquid treated in the second biological treatment tank is subjected to solid-liquid separation to separate it into treated water and sludge. The treated water is discharged outside the system. A part of the sludge is returned to the second biological treatment tank.

In the fifth aspect, the rest of the sludge that is subjected to solid-liquid separation or a part of the sludge in the second biological treatment tank is introduced into a third biological treatment tank to undergo aerobic treatment. Subsequently, a part of or all of the sludge that is aerobically treated is dehydrated to separate it into the solid content and water. The solid content is drained as excess sludge and the water is returned to the first biological treatment tank and/or the second biological treatment tank.

The predation by animalcules in the third biological treatment tank reduces the amount of sludge. The pH of the third biological treatment tank is adjusted to 6 or less, in particular, in the range of 5 to 5.5, thereby satisfactorily reducing the amount of sludge.

In the fifth aspect, the SRT of the second biological treatment tank and the third biological treatment tank is preferably 40 days or less, for example, in the range of 10 to 40 days, and in particular, in the range of 15 to 30 days. In such a case, the amount of microorganisms or metabolic products in the tanks are appropriately reduced, and thus animalcules with high activity can be maintained in the tanks.

The preferred embodiments of the fifth aspect will now be described in detail with reference to the drawings.

Figure 14:
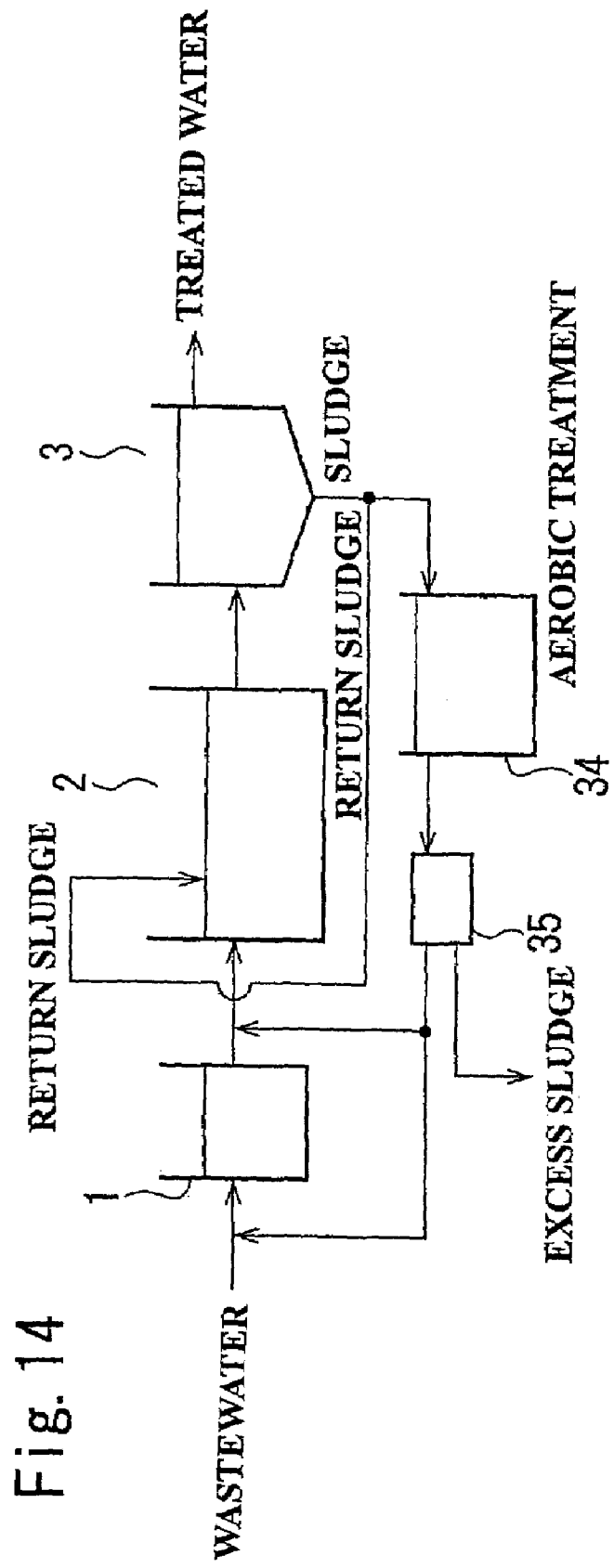
FIG. 14 is a flow diagram showing an embodiment of a process for biological treatment of organic wastewater according to a fifth aspect.
Figure 15:
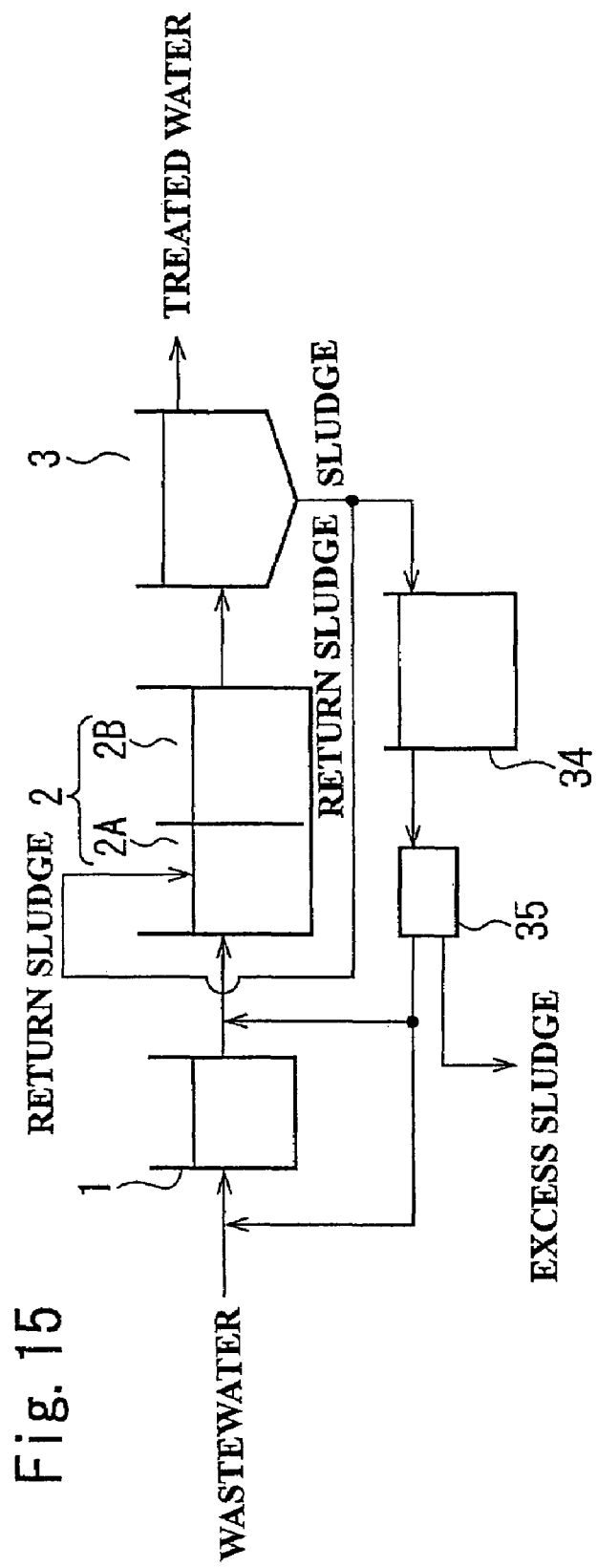
FIG. 15 is a flow diagram showing another embodiment of the process for biological treatment of organic wastewater according to the fifth aspect.

FIGS. 14 and 15 are flow diagrams showing the preferred embodiments of the fifth aspect.

In a process shown in FIG. 14, raw water (organic wastewater) is first introduced into a first biological treatment tank (bacteria tank) 1, and at least 70%, preferably at least 80%, and more preferably at least 90% of the BOD (organic component) is subjected to oxidative decomposition or converted to bacterial cells by the bacteria. The pH of the first biological treatment tank 1 is 6 or more, preferably in the range of pH 6 to 8. The BOD volume load in the first biological treatment tank 1 is 1 kg/m$^3$/d or more, for example, 1 to 20 kg/m$^3$/d, and the hydraulic retention time (HRT) is 24 hours or less, for example, 0.5 to 24 hours. In such a case, treated water in which non-flocculating bacteria are dominant can be obtained, and by reducing the HRT, wastewater having a low BOD concentration can be treated at a high load.

The water treated in the first biological treatment tank 1 is introduced into a second biological treatment tank (animalcule tank) 2. In this second biological treatment tank 2, the oxidative decomposition of the remaining organic component, the autolysis of the bacteria, and the predation by the animalcules are performed, thereby reducing the amount of sludge.

The sludge in the second biological treatment tank 2 includes a high content of animalcules. The animalcules account for at least 5% of the SS, and under some operating conditions, 30% of the SS or more.

Since the second biological treatment tank 2 uses the activity of animalcules whose proliferation rate is lower than that of bacteria and the autolysis of the bacteria, suitable operating conditions and treatment apparatus must be used so that the animalcules and the bacteria stay in the system. In order to achieve this, in the second biological treatment tank 2, an activated sludge process in which the sludge is returned or a membrane-separation-type activated sludge process is preferably employed. More preferably, in order to increase the amount of the animalcules kept in the tank, an aerating tank in which a carrier is added may be used as the second biological treatment tank.

The second biological treatment tank 2 is set to an acidic condition of pH 6 or less, for example, in the range of pH 5 to 6, and preferably in the range of pH 5 to 5.5. Thereby, the predation of bacteria by the animalcules can be efficiently performed.

When a large amount of organic substance remains in the treated liquid from the first biological treatment tank 1, which is introduced into the second biological treatment tank 2, the oxidative decomposition of the organic substance is performed in the second biological treatment tank 2. It is known that when the oxidative decomposition of the organic substance by bacteria is performed in the second biological treatment tank 2 containing a large amount of animalcules, the bacteria proliferate in a form that enables their escape from the animalcules that perform predation. A group of bacteria that are proliferated in the above-described form are not preyed upon by the animalcules, and thus the decomposition of the bacteria depends on only the autolysis thereof. Consequently, the volume of the sludge is not easily reduced in the second biological treatment tank 2 and a third biological treatment tank 34 described below. Furthermore, in the case where the second biological treatment tank 2 is set to an acidic condition of pH 6 or less, when a large amount of organic substance remains, fungi and the like proliferate using the organic substance, which may result in bulking. Therefore, as described above, most of the organic substances, i.e., at least 70% and preferably at least 80% of the BOD in the wastewater are preferably decomposed to convert them to bacteria in the first biological treatment tank 1. The soluble BOD sludge load in the second biological treatment tank 2 is preferably 0.1 kg-BOD/kg-MLSS/d or less.

The liquid treated in the second biological treatment tank 2 is subjected to solid-liquid separation in a sedimentation tank 3. The separated water is discharged outside the system as treated water. A part of the separated sludge is returned to the second biological treatment tank 2. The rest of the separated sludge is sent to the third biological treatment tank 34 and is subjected to aerobic treatment, thus reducing the volume of the sludge.

Regarding the separated sludge from the sedimentation tank 3, the ratio of the separated sludge returned to the second biological treatment tank 2 to that returned to the third biological treatment tank 34 is preferably changed according to the amount of the sludge generated as long as the sludge retention time in the third biological treatment tank 34 described below can be maintained.

When the operation of this apparatus for wastewater treatment is started., or when the amount of sludge generated in the first biological treatment tank 1 or the second biological treatment tank 2 is high, the half or more of the sludge separated in the sedimentation tank 3 may be supplied to the third biological treatment tank 34. The sludge retention time (SRT) in the third biological treatment tank 34 is preferably 12 hours or more, and particularly preferably 24 hours or more, for example, in the range of 24 to 960 hours.

The reduction in the amount of sludge in the third biological treatment tank 34 is caused by the predation by animalcules as in the second biological treatment tank 2. Therefore, the pH of the third biological treatment tank 34 is maintained at 6 or less, preferably in the range of 5 to 5.5, thereby obtaining a marked reduction in the amount of sludge. However, when the pH of the third biological treatment tank 34 is adjusted to this condition, because of the marked reduction in the amount of sludge, the concentration of the sludge in the third biological treatment tank 34 may be excessively decreased, resulting in a difficulty in the subsequent dehydration of the sludge using a dehydrator 35. In such a case, an aerobic treatment tank in which a sedimentation tank is provided to return the sludge, a fluidized bed in which a carrier is added, or a membrane-separation-type aerobic treatment tank may be used as the third biological treatment tank 34 so as to increase the concentration of the sludge.

The sludge retention time (SRT) in the third biological treatment tank 34 is 12 hours or more, and preferably 24 hours or more, for example, in the range of 24 to 960 hours. However, when an aerobic treatment process in which a solid-liquid separation unit is provided to return the sludge, a fluidized bed in which a carrier is added, or the membrane-separation-type aerobic treatment process is employed, the sludge retention time can be further increased.

The sludge whose volume is reduced in the third biological treatment tank 34 is introduced into the dehydrator 35 and is subjected to a solid-liquid separation treatment. A part of the sludge from the third biological treatment tank 34 may be returned to the second biological treatment tank 2 instead of introducing into the dehydrator 35. The sludge (solid content) dehydrated in the dehydrator 35 is discharged outside the system as excess sludge. The filtrate (water) obtained by the dehydration is supplied to the first biological treatment tank 1 and/or the second biological treatment tank 2.

Thus, according to the process for biological treatment of organic wastewater shown in FIG. 14, the organic wastewater can be efficiently treated and the amount of excess sludge generated can be reduced.

In the present invention, as shown in FIG. 15, the second biological treatment tank 2 may have a multistage structure. Specifically, two biological treatment tanks 2A and 2B may be provided in series. In the former stage treatment tank 2A, a treatment may be performed under a condition of pH 5 to 6, preferably pH 5 to 5.5, and in the latter stage treatment tank 2B, a treatment may be performed under a condition of pH 6 or more, preferably pH 6 to 8. According to such a multistage treatment, the predation of the sludge by animalcules can be efficiently performed in the former stage treatment tank 2A, and the efficiency of the solid-liquid separation of the sludge can be increased and the quality of the treated water can be improved in the latter stage treatment tank 2B. The process shown in FIG. 15 only differs from the process shown in FIG. 14 in that the second biological treatment tank 2 has a multistage structure, and other structures are the same as those in FIG. 14. The same reference numerals indicate the same parts.

Additionally, in order to reduce the amount of the sludge generated in the second biological treatment tank 2, the pH of the second biological treatment tank 2 composed of a single tank shown in FIG. 14 may be set to 6 or less without providing a partition shown in FIG. 15. In this case, however, neutralization is necessary before the treated water is released.

The processes shown in FIGS. 14 and 15 show examples of the fifth aspect. The fifth aspect is not limited to the processes shown in the figures as long as the processes do not depart from the essence of the aspect.

Instead of the separated sludge of the sedimentation tank 3, the sludge drained from the second biological treatment tank 2 (and a part of the separated sludge of the sedimentation tank 3) may be introduced into the third biological treatment tank 34.

By draining 1/40 or more, preferably 1/30 or more of the sludge from each of the second biological treatment tank and the third biological treatment tank per day, the amount of sludge can be reduced more stably. In this case, the operation is performed under a condition of an SRT of 40 days or less, preferably 30 days or less. The operation performed under such a condition provides an advantage that animalcules with high activity can be maintained in the tanks by appropriately reducing the amount of animalcules and metabolic products in the tanks.

In order to achieve a high-load treatment in the first biological treatment tank 1, a part of the separated sludge in the latter-stage sedimentation tank 3 may be returned to the first biological treatment tank 1. Alternatively, as the first biological treatment tank 1, two or more biological treatment tanks may be provided in series so as to perform a multistage treatment.

A carrier may be added to the first biological treatment tank 1. The first biological treatment tank 1 may be a fluidized bed in which a carrier is added. In such a case, the treatment can be performed at a high BOD volume load of 5 $kg/m^3/d$ or more.

Since the second biological treatment tank 2 uses the activity of animalcules whose proliferation rate is lower than that of bacteria and the autolysis of the bacteria, it is important that suitable operating conditions and treatment apparatus are determined so that the animalcules and the bacteria stay in the system. In order to achieve this, in the second biological treatment tank 2, an activated sludge process shown in FIGS. 14 and 15 in which the sludge is returned or a membrane-separation-type activated sludge process is preferably employed. In this case, the amount of the animalcules kept in the tank can be increased by adding a carrier to the aerating tank.

The carrier added to the first biological treatment tank 1 and the second biological treatment tank 2 may have any shape, for example, a spherical shape, pellets, a hollow cylindrical shape, or a filamentous shape, and may have a diameter of about 0.1 to 10 mm. Examples of the material of the carrier include, but are not limited to, natural materials, inorganic materials, and polymer materials. A gel substance may also be used.

EXAMPLES AND COMPARATIVE EXAMPLES OF THE FIFTH ASPECT

The fifth aspect will now be described more specifically by way of examples and comparative examples.

Example 8

As shown in FIG. 14, a treatment of organic wastewater (BOD 630 mg/L) according to the present invention was performed at a rate of 22 L/d using an experimental apparatus in which a first biological treatment tank (activated sludge tank (not including a sludge return)) 1 with a volume of 3.6 L, a second biological treatment tank (activated sludge tank) 2 with a volume of 15 L, a sedimentation tank 3, and a third biological treatment tank 34 with a volume of 4 L were connected to each other. The pH of each of the biological treatment tanks 1, 2, and 34 was adjusted to 6.8. The operation was performed under the following conditions: In the first biological treatment tank 1, the soluble BOD volume load was 3.85 kg-BOD/m$^3$/d and the HRT was 4 hours. In the second biological treatment tank 2, the soluble BOD sludge load was 0.022 kg-BOD/kg-MLSS/d and the HRT was 17 hours. As a whole, the BOD volume load was 0.75 kg-BOD/m$^3$/d and the HRT was 21 hours.

The concentration of the SS in the second biological treatment tank 2 was 4,000 mg/L and that in the sludge precipitated in the sedimentation tank 3 was 10,000 mg/L. The concentrated sludge was drained from the sedimentation tank 3. Among the drained sludge, the sludge was introduced into the third biological treatment tank 34 at a rate of 250 mL/d and the rest of the sludge was returned to the second biological treatment tank 2. The HRT and the SRT of the third biological treatment tank 34 were set to 16 days. The sludge treated in the third biological treatment tank 34 was dehydrated using the dehydrator 35. The dehydrated sludge was discharged as excess sludge and the filtrate obtained by the dehydration was returned to the second biological treatment tank 2.

The operation was continuously performed under the above conditions for four months. As a result, the sludge conversion ratio was 0.14 kg-MLSS/kg-BOD. The BOD of the supernatant water flowing from the sedimentation tank 3 was of the detection limit or lower.

Example 9

A treatment of the same organic wastewater (BOD 630 mg/L) as in Example 8 was performed using the same experimental apparatus as in Example 8. The pH of each of the biological treatment tanks 1 and 2 was adjusted to 6.8 and the pH of the third biological treatment tank 34 was adjusted to 5.0. The concentration of the SS in the second biological treatment tank 2 was 5,000 mg/L. Other conditions were the same as those in Example 8.

The sludge drained from the sedimentation tank 3 was 10,000 mg/L as in Example 8.

The operation was continuously performed under the above conditions for four months. As a result, the sludge conversion ratio calculated from the amount of sludge drained from the second biological treatment tank 2 was 0.08 kg-MLSS/kg-BOD.

Comparative Example 5

As shown in FIG. 11, a treatment of organic wastewater (BOD 630 mg/L) was performed at a rate of 18 L/d using an experimental apparatus including a biological treatment tank (activated sludge tank) 2' with a volume of 15 L and a sedimentation tank 3. The amount of discharged excess sludge was 250 mL/d. In the biological treatment tank 2', the soluble BOD volume load was 0.76 kg-BOD/m$^3$/d, the HRT was 20 hours, and the pH was adjusted to 6.8. The operation was continuously performed under the above conditions for four months. As a result, the treated water was satisfactory, but the sludge conversion ratio was 0.40 kg-MLSS/kg-BOD.

Comparative Example 6

As shown in FIG. 12, a treatment of organic wastewater (BOD 630 mg/L) was performed at a rate of 22 L/d as in Example 8 using the same experimental apparatus as in Example 8 except that the third biological treatment tank 34 was not provided. The amount of discharged excess sludge was 250 mL/d. The pH condition, the load condition, and the like of each tank were the same as those in Example 8.

The operation was continuously performed under the above conditions for four months. As a result, the treated water was satisfactory, but the sludge conversion ratio calculated from the amount of sludge drained from the second biological treatment tank 2 was 0.20 kg-MLSS/kg-BOD. The ratio of animalcules to the VSS in the second biological treatment tank 2 was about 25% (w/w).

Figure 16:
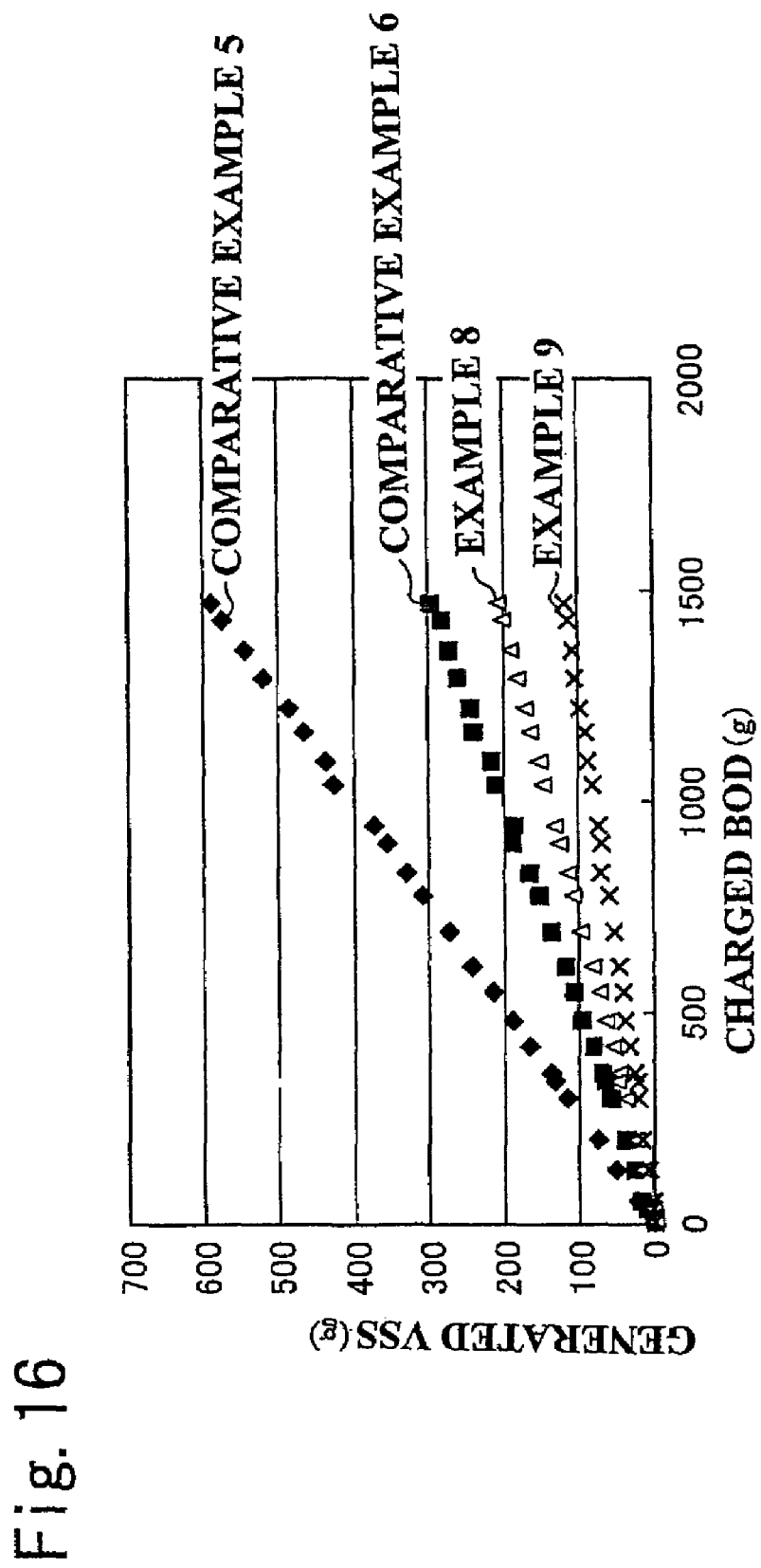
FIG. 16 is a graph showing the relationship between the amount of charged BOD and the amount of excess sludge generated in Examples 8 and 9 and Comparative Examples 5 and 6.

FIG. 16 shows the relationship between the charged BOD and the amount of excess sludge (sludge conversion ratio) generated in Examples 8 and 9 and Comparative Examples 5 and 6. Table 3 shows the operational status four months after the initiation of the experiments of Examples 8 and 9, and Comparative Examples 5 and 6.

TABLE 3

| | Raw water | | First biological treatment tank (3.6 L) | | Second biological treatment tank (15 L) | | |
|---|---|---|---|---|---|---|---|
| | BOD (mg/L) | Flow rate (L/d) | BOD volume load (kg-BOD/m$^3$/d) | Soluble BOD in outlet water (mg/L) | Content of animalcules (%-VSS) | MLSS (mg/L) | BOD in treated water (mg/L) |
| Example 8 | 630 | 22 | 3.85 | 73 | 30 | 4000 | Detection limit or lower |
| Example 9 | 630 | 22 | 3.85 | 72 | 30 | 5000 | Detection limit or lower |
| Comparative Example 5 | 630 | 18 | — | — | 5 | 4500 | Detection limit or lower |
| Comparative Example 6 | 630 | 22 | 3.85 | 70~79 | 25 | 5000 | Detection limit or lower |

The above results showed the following.

In Comparative Example 5 a known activated sludge process was performed. In Comparative Example 6, a known two-stage biological treatment process was performed. In the known activated sludge process (Comparative Example 5), the sludge conversion ratio was 0.40 kg-MLSS/kg-BOD. By introducing the multistage biological treatment as in Comparative Example 6, the sludge conversion ratio was 0.20 kg-MLSS/kg-BOD, thus reducing the amount of sludge generated to ½. This reduction in the amount of sludge was about the same level as that in two-stage biological treatment processes that have been reported to date.

In contrast, in Examples 8 and 9 including the third biological treatment tank 34, the sludge conversion ratios were 0.14 and 0.08 kg-MLSS/kg-BOD, respectively. Thus, the amount of sludge generated could be markedly reduced compared with the known processes. In particular, in Example 9 in which the pH of the third biological treatment tank 34 was 5.0, the amount of sludge could be reduced to ⅕ of that in the known activated sludge process.

[Sixth and Seventh Aspects]

According to processes for biological treatment of organic wastewater and apparatuses of sixth and seventh aspects, in a multistage activated sludge process involving a predation effect caused by animalcules, treatment efficiency can be further increased and the amount of excess sludge generated can be further reduced while a stable quality of the treated water is maintained.

Organic wastewater is introduced into a first biological treatment tank and most of the organic components (for example, 70% or more) are subjected to oxidative decomposition by non-flocculating bacteria. The liquid treated in the first biological treatment tank is introduced into a second biological treatment tank to perform oxidative decomposition of the remaining organic components, the autolysis of the non-flocculating bacteria, and the predation by animalcules, thereby reducing the amount of sludge.

In the sixth aspect, the sludge retention time (SRT) in the second biological treatment tank is controlled to 5 to 40 days. That is, ⅕ to ¹⁄₄₀ of the sludge in the second biological treatment tank per day is drained such that the SRT in the second biological treatment tank is 5 to 40 days. Thus, a predetermined amount of sludge in the second biological treatment tank is drained to reduce the amount of animalcules and the feces in the second biological treatment tank. Thereby, a certain amount of animalcules in a state capable of laying eggs can be constantly maintained at a relatively high content in the second biological treatment tank. Consequently, a satisfactory reduction in the amount of sludge can be achieved.

The sludge of the second biological treatment tank in which the content of the animalcules is relatively high can be easily solubilized by any physical, chemical, and biological treatments compared with normal activated sludge. The amount of sludge can be further reduced by the solubilization.

In the seventh aspect, the sludge of the second biological treatment tank is oxidized under aerobic conditions in a third biological treatment tank. In this seventh aspect, the sludge in each of the second biological treatment tank and the third biological treatment tank is also drained such that the SRT in each tank is 5 to 40 days. Thereby, the animalcules can be maintained at a high content in both tanks to efficiently reduce the amount of sludge.

The preferred embodiments of processes for biological treatment of organic wastewater of the sixth and seventh aspects will now be described in detail with reference to the drawings.

Figure 17:
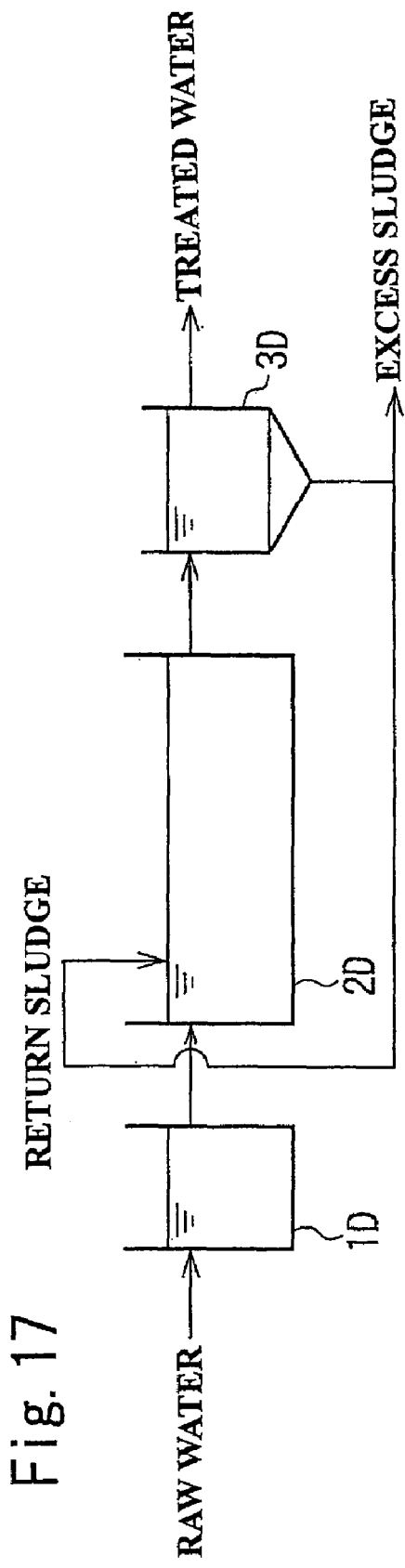
FIG. 17 is a flow diagram showing an embodiment of a process for biological treatment of organic wastewater of the present invention.

FIG. 17 is a flow diagram showing an embodiment of a process for biological treatment of organic wastewater of the present invention.

In the process shown in FIG. 17, raw water (organic wastewater) is first introduced into a first biological treatment tank (dispersed bacteria tank) 1D, and at least 70%, preferably at least 80%, and more preferably at least 90% of the BOD (organic component) is subjected to oxidative decomposition by non-flocculating bacteria. The pH of the first biological treatment tank 1D is 6 or more, preferably in the range of pH 6 to 8. The BOD volume load in the first biological treatment tank 1D is 1 kg/m³/d or more, for example, 1 to 20 kg/m³/d, and the hydraulic retention time (HRT) is 24 hours or less, for example, 0.5 to 24 hours. In such a case, treated water in which the non-flocculating bacteria are dominant can be obtained, and by reducing the HRT, wastewater having a low BOD concentration can be treated at a high load.

The treated water in the first biological treatment tank 1D is introduced into a second biological treatment tank (animalcule tank) 2D. In this second biological treatment tank 2D, the oxidative decomposition of the remaining organic component, the autolysis of the non-flocculating bacteria, and the predation by the animalcules are performed, thereby reducing the amount of sludge.

Since the second biological treatment tank 2D uses the activity of animalcules whose proliferation rate is lower than that of bacteria and the autolysis of the bacteria, suitable operating conditions and treatment apparatus must be used so that the animalcules and the bacteria stay in the system. In order to achieve this, in the second biological treatment tank 2D, an activated sludge process in which the sludge is returned or a membrane-separation-type activated sludge process is preferably employed. More preferably, in order to increase the amount of the animalcules kept in the tank, an aerating tank in which a carrier is added may be used as the second biological treatment tank 2D.

The second biological treatment tank 2D is set to an acidic condition of pH 6 or less, for example, in the range of pH 5 to 6, and preferably in the range of pH 5 to 5.5. Thereby, the predation of bacteria by the animalcules can be efficiently performed.

Thus, the amount of sludge generated can be reduced to 50% of that in the normal process. However, in the case where the amount of sludge drained from the second biological treatment tank is decreased, that is, in the case where the SRT is increased, as described above, even when a sufficient amount of animalcules exist in the tank, they do not lay eggs. In addition, in such a case, a large portion of sludge is composed of dung pat, the amount of bacteria serving as bait is decreased, and the animalcules in the tank may naturally die all at once. When the amount of the animalcules in the second biological treatment tank 2D is drastically decreased, is takes one month or more to recover. In order to prevent this problem, it is necessary that the sludge in the second biological treatment tank 2D be periodically replaced, that is, the amount of the animalcules and the feces be reduced. For this purpose, in the sixth aspect, the sludge in the second biological treatment tank 2D is drained such that the SRT of the second biological treatment tank 2D is constant in the range of 5 to 40 days, preferably 10 to 30 days, and more preferably 20 to 30 days. That is, the sludge in the second biological treatment tank 2D is drained in the ratios of ¹⁄₄₀ to ⅕, preferably ¹⁄₃₀ to ¹⁄₁₀, or more preferably ¹⁄₂₀ to ¹⁄₃₀ per day. By operating the second biological treatment tank 2D under the above condition, the ratio of animalcules to SS in the tank can be maintained at 10% or more, preferably in the range of 15% to 30%. This process can stably maintain a state in which the amount of sludge generated is constantly small.

This sludge drained from the second biological treatment tank 2D has a content of animalcules higher than that of activated sludge generated in a normal single-tank treatment or that of activated sludge generated in a multistage activated sludge process wherein the concentration of the sludge in a second biological treatment tank is merely increased. Accordingly, since this sludge can be easily solubilized by any physical, chemical, and biological treatments, the sludge is preferably solubilized by these treatments. Examples of the method used for the solubilization include ultrasonic treatment, ozone treatment, cavitation, acid or alkali treatment, treatment with an oxidizing agent, high-temperature treatment, and anaerobic digestion. The sludge drained from the second biological treatment tank 2D can be easily solubilized by any of these methods with little energy and within a short processing time. The solubilized sludge may be returned to the second biological treatment tank 2D. Alternatively, the solubilized sludge may be subjected to solid-liquid separation, the separated water may be returned to the first biological treatment tank 1D and/or the second biological treatment tank 2D, and the solid content may be returned to the second biological treatment tank 2D. Alternatively, a part of or all of the solid content may be drained as excess sludge. When the method used for solubilization is a biological method such as anaerobic digestion, after solid-liquid separation, the sludge may be returned to the anaerobic digestion sludge tank so as to extend the SRT, thereby further accelerating solubilization and mineralization.

In the present invention, when a large amount of organic substance remains in the treated liquid from the first biological treatment tank 1D, which is introduced into the second biological treatment tank 2D, the oxidative decomposition of the organic substance is performed in the second biological treatment tank 2D. It is known that when the oxidative decomposition of the organic substance by bacteria is performed in the second biological treatment tank 2D containing a large amount of animalcules, the bacteria proliferate in a form that enables their escape from the animalcules that perform predation. A group of bacteria that are proliferated in the above-described form are not preyed upon by the animalcules, and thus the decomposition of the bacteria depends on only the autolysis thereof. Consequently, the volume of the sludge is not easily reduced. Furthermore, in the case where the second biological treatment tank 2D is set to an acidic condition of pH 6 or less, when a large amount of organic substance remains, fungi and the like proliferate using the organic substance, which may result in bulking. Therefore, as described above, most of the organic substances, i.e., at least 70% and preferably at least 80% of the BOD in the wastewater are preferably decomposed to convert it to bacteria in the first biological treatment tank 1D. The soluble BOD sludge load in the second biological treatment tank 2D is preferably 0.1 kg-BOD/kg-MLSS/d or less.

The treated liquid in the second biological treatment tank 2D is subjected to solid-liquid separation in a sedimentation tank 3D. The separated water is discharged outside the system as treated water. A part of the separated sludge is discharged outside the system as excess sludge according to need, and the rest of the separated sludge is returned to the second biological treatment tank 2D.

In the present invention, an aerobic digestion tank that again performs oxidization treatment of the sludge drained from the second biological treatment tank 2D or the separated sludge obtained by solid-liquid separation of sludge in the second biological treatment tank (in FIG. 17, the separated sludge in the sedimentation tank 3D) under aerobic conditions may be provided as a third biological treatment tank (not shown in FIG. 17). In this case, from the same reason as that in the second biological treatment tank, regarding not only the second biological treatment tank but also the third biological treatment tank, the SRT is preferably controlled so as to be constant in the range of 5 to 40 days, preferably 10 to 30 days, and more preferably 10 to 20 days. In the third biological treatment tank, as long as such an SRT is satisfied, an aerobic treatment process in which a sedimentation tank is provided to return the sludge, a fluidized bed process in which a carrier is added, or a membrane-separation-type aerobic treatment process may be employed to increase the SRT. A part of or all of the treated sludge from the third biological treatment tank may be returned to the second biological treatment tank. Alternatively, the treated sludge may be subjected to solid-liquid separation, the separated water may be returned to the first biological treatment tank and/or the second biological treatment tank, and the solid content may be returned to the second biological treatment tank. Alternatively, a part of or all of the solid content may be drained as excess sludge.

The amount of the sludge supplied to the third biological treatment tank is preferably changed according to the amount of sludge generated as long as the above-described SRT in the third biological treatment tank can be maintained.

The reduction in the amount of sludge in the third biological treatment tank is caused by the predation by animalcules as in the second biological treatment tank. Therefore, the pH of the third biological treatment tank is maintained at 6 or less, preferably in the range of 5 to 5.5, thereby obtaining a marked reduction in the amount of sludge. However, when the pH of the third biological treatment tank is adjusted to this condition, because of the marked reduction in the amount of sludge, the concentration of the sludge in the third biological treatment tank may be markedly decreased. In such a case, as described above, an aerobic treatment tank in which a sedimentation tank is provided to return the sludge, a fluidized bed in which a carrier is added, or a membrane-separation-type aerobic treatment tank may be particularly preferably used as the third biological treatment tank, thereby increasing the concentration of the sludge.

According to the processes for biological treatment of organic wastewater of the sixth and seventh aspects, the organic wastewater can be efficiently treated and the amount of excess sludge generated can be stably reduced over a long period of time.

The process shown in FIG. 17 shows an example of the embodiment of the sixth aspect. The sixth and seventh aspects are not limited to the processes shown in the figure as long as the processes do not depart from the essence of the aspects.

For example, the second biological treatment tank may have a multistage structure. Specifically, two biological treatment tanks may be provided in series. In the former stage treatment tank, a treatment may be performed under a condition of pH 5 to 6, preferably pH 5 to 5.5, and in the latter stage treatment tank, a treatment may be performed under a condition of pH 6 or more, preferably pH 6 to 8. According to such a multistage treatment, the predation of the sludge by animalcules can be efficiently performed in the former stage treatment tank, and the efficiency of the solid-liquid separation of the sludge can be increased and the quality of the treated water can be improved in the latter stage treatment tank.

In order to achieve a high-load treatment in the first biological treatment tank 1D, a part of the separated sludge in the latter-stage sedimentation tank 3D may be returned to the first biological treatment tank 1D. Alternatively, as the first biological treatment tank 1D, two or more biological treatment tanks may be provided in series to perform a multistage treatment.

A carrier may be added to the first biological treatment tank 1D. The first biological treatment tank 1D may be a fluidized bed in which a carrier is added. In such a case, the treatment can be performed at a high BOD volume load of 5 kg/m$^3$/d or more.

As described above, since the second biological treatment tank 2D uses the activity of animalcules whose proliferation rate is lower than that of bacteria and the autolysis of the bacteria, it is important that suitable operating conditions and treatment apparatus are determined so that the animalcules and the bacteria stay in the system. In order to achieve this, in the second biological treatment tank, an activated sludge process shown in FIG. 17 in which the sludge is returned or a membrane-separation-type activated sludge process is preferably employed. In this case, the amount of the animalcules kept in the tank can be increased by adding a carrier to the aerating tank.

The carrier added to the first biological treatment tank and the second biological treatment tank may have any shape, for example, a spherical shape, pellets, a hollow cylindrical shape, or a filamentous shape, and may have a diameter of about 0.1 to 10 mm. Examples of the material of the carrier include, but are not limited to, natural materials, inorganic materials, and polymer materials. A gel substance may also be used.

EXAMPLES AND COMPARATIVE EXAMPLES OF THE SIXTH AND SEVENTH ASPECTS

The sixth and seventh aspects will now be described more specifically by way of examples, comparative examples, and a reference example.

Example 10

As shown in FIG. 17, a treatment of organic wastewater (BOD 630 mg/L) according to the present invention was performed at a rate of 22 L/d using an experimental apparatus in which a first biological treatment tank (activated sludge tank (without sludge return)) 1D with a volume of 3.6 L, a second biological treatment tank (activated sludge tank) 2D with a volume of 15 L, and a sedimentation tank 3D were connected to each other. The pH of each of the biological treatment tanks 1D and 2D was adjusted to 6.8. The operation was performed under the following conditions: In the first biological treatment tank 1D, the soluble BOD volume load was 3.85 kg-BOD/m$^3$/d and the HRT was 4 hours. In the second biological treatment tank 2D, the soluble BOD sludge load was 0.022 kg-BOD/kg-MLSS/d and the HRT was 17 hours. As a whole, the BOD volume load was 0.75 kg-BOD/m$^3$/d and the HRT was 21 hours. Regarding the second biological treatment tank 2D, 1/25 of the sludge therein per day was drained such that the SRT was 25 days, and the drained sludge was discharged outside the system.

Figure 18:
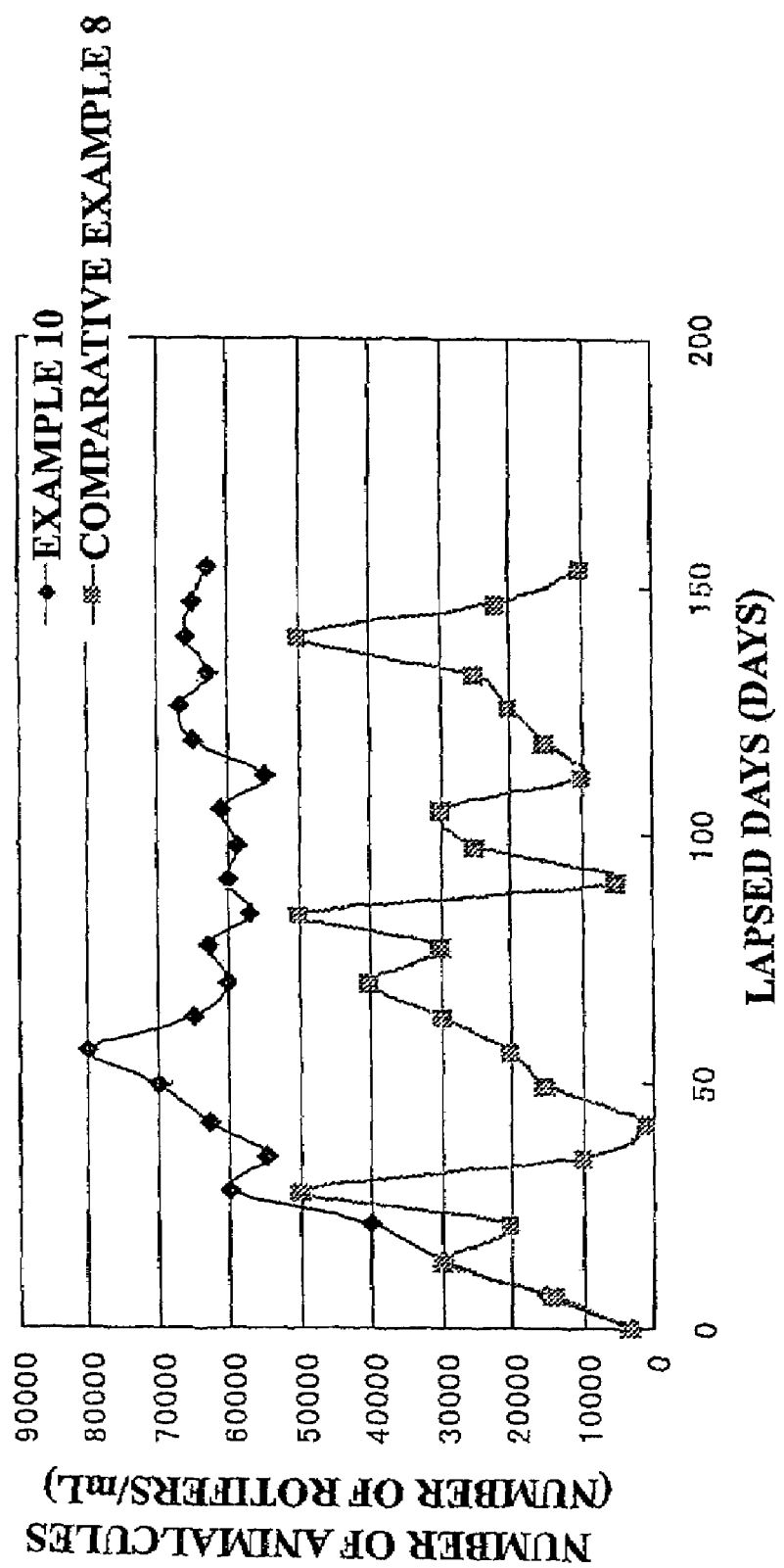
FIG. 18 is a graph showing the relationship between the number of animalcules in a second biological treatment tank and lapsed days in Example 10 and Comparative Example 8.
Figure 19:
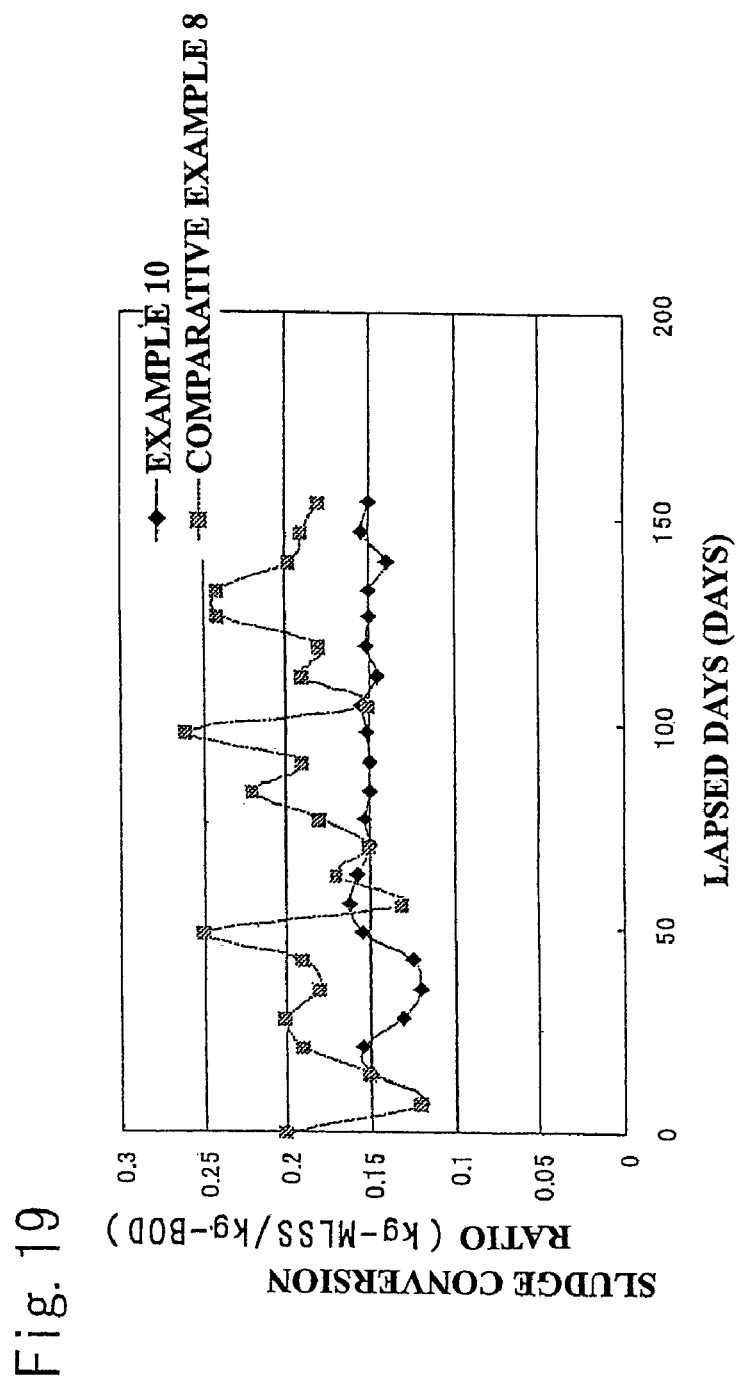
FIG. 19 is a graph showing the relationship between the sludge conversion ratio and lapsed days in Example 10 and Comparative Example 8.

FIG. 18 shows the relationship between the number of animalcules in the second biological treatment tank 2D and lapsed days in this experiment. FIG. 19 shows the relationship between the sludge conversion ratio and lapsed days.

The concentration of the SS in the second biological treatment tank 2D was 3,500 mg/L. The dominant species of the animalcules in the tank were *Euchlanis* and *Bdelloida*, which numbered about 30,000 per milliliter and about 35,000 per milliliter, respectively. The ratio of animalcules to SS in the tank was about 50%. This state was stably maintained for five months or longer. The sludge conversion ratio was 0.15 kg-MLSS/kg-BOD. A 60% decrease in the amount of sludge was stably maintained compared with the sludge conversion ratio of 0.37 kg-MLSS/kg-BOD in Comparative Example 7 described below, which was performed by means of single-tank treatment. The BOD of the treated water obtained from the sedimentation tank 3D was of the detection limit or lower.

When the sludge drained from the second biological treatment tank 2D was subjected to anaerobic digestion under a condition of an SRT of 15 days, 50% of the chemical oxygen demand (COD) was converted to methane. Considering this effect, the reduction in the amount of sludge could be at least 75% that in the known method.

Comparative Example 7

As shown in FIG. 11, a treatment of organic wastewater (BOD 630 mg/L) was performed at a rate of 18 L/d using an experimental apparatus including a biological treatment tank (activated sludge tank) 2' with a volume of 15 L and a sedimentation tank 3. The amount of return sludge was 250 mL/d and the amount of discharged excess sludge was 250 mL/d. In the biological treatment tank 2', the soluble BOD volume load was 0.76 kg-BOD/m$^3$/d, the HRT was 20 hours, and the pH was adjusted to 6.8. The operation was continuously performed under the above conditions. As a result, the quality of the treated water was satisfactory, but the sludge conversion ratio was 0.37 kg-MLSS/kg-BOD.

Comparative Example 8

The operation was performed under the same conditions as those in Example 10, except that the amount of sludge drained from the second biological treatment tank 2D was 1/45 of the sludge in the tank per day such that the SRT was 45 days.

FIG. 18 shows the relationship between the number of animalcules in the second biological treatment tank 2D and lapsed days in this experiment. FIG. 19 shows the relationship between the sludge conversion ratio and lapsed days.

In Comparative Example 8, the amount of sludge drained from the second biological treatment tank 2D was smaller that that in Example 10. Therefore, the concentration of the SS in the second biological treatment tank 2D was high, 5,000 mg/L, but the sludge having this concentration could be subjected to the activated sludge process. The dominant species of the animalcules in the second biological treatment tank 2D were *Bdelloida*. The number thereof constantly varied in the range of 0 to 50,000 per milliliter, and the ratios of animalcules to SS in the tank ranged from 0% to 25%. Under this condition, a large amount of animalcules died about every 40 days. Each time a large amount of animalcules died, the sludge conversion ratio increased. Consequently, although the quality of the treated water was satisfactory, the average sludge conversion ratio was 0.20 kg-MLSS/kg-BOD, and thus the reduction in the amount of sludge was no more than about 45% that in Comparative Example 7.

Even when the sludge drained from the second biological treatment tank 2D was subjected to anaerobic digestion under the condition of the SRT of 15 days, since the content of the animalcules was low, only 30% of the COD was converted to methane. Even when this effect was considered, the reduction on the amount of sludge was about 60% that in the known method.

The above results showed the following. The introduction of the two-stage biological treatment process can reduce the amount of sludge generated by about 45% on average. However, as in Comparative Example 8, when the SRT is set to be markedly long in order to increase the concentration of the sludge in the second biological treatment tank, the number of animalcules in the second biological treatment tank cannot be stabilized and the sludge conversion ratio also constantly varies. As a result, a satisfactory reduction in the amount of sludge cannot be achieved.

However, as in Example 10, by periodically draining the sludge in the second biological treatment tank according to the life cycle of the animalcules that are desirably maintained in the second biological treatment tank 2D, the reduction in the amount of sludge was increased to 60%. Furthermore, since the resulting excess sludge contains a large amount of metazoa such as rotifers, the amount of sludge can be easily reduced by anaerobic digestion compared with normal sludge. Thus, the amount of sludge can be further reduced.

Example 11

The treatment was performed as in Example 10 except the following. A part of the separated sludge of the sedimentation tank 3D was supplied to a third biological treatment tank with a volume of 6 L at a rate of 600 mL/d, and the rest of the separated sludge was returned to the second biological treatment tank 2D. The sludge that was subjected to aerobic digestion in the third biological treatment tank was subjected to solid-liquid separation. The separated water was returned to the first biological treatment tank 1D and the separated sludge was returned to the second biological treatment tank 2D.

The pH of the third biological treatment tank was adjusted to 5.0. In addition, 1/10 of the sludge in the third biological treatment tank per day was drained such that the SRT in the tank was 10 days, and the drained sludge was discharged outside the system. As a result, the BOD of the treated water obtained from the sedimentation tank was of the detection limit or lower, and the sludge conversion ratio was 0.7 kg-MLSS/kg-BOD.

Reference Example 1

The operation was performed under the same conditions as those in Example 11 except that 1/45 of the sludge in the third biological treatment tank per day was drained such that the SRT in the tank was 45 days. As a result, although the quality of the treated water was the same level as that of Example 11, the sludge conversion ratio was 0.11 kg-MLSS/kg-BOD, and thus the reduction in the amount of sludge caused by the presence of the third biological treatment tank was decreased.

According to Example 11 and Reference Example 1, when the third biological treatment tank is provided to further perform aerobic digestion, the amount of sludge can be further reduced. However, when the SRT in the third biological treatment tank is markedly long, the reduction in the amount of sludge caused by the presence of the third biological treatment tank is decreased.

[Eighth and Ninth Aspects]

According to processes for biological treatment of organic wastewater of eighth and ninth aspects, in a multistage activated sludge process involving a predation effect caused by animalcules, treatment efficiency can be further increased and the amount of excess sludge generated can be further reduced on the basis of the following operation and effect, while a stable quality of the treated water is maintained.

Among the states of bacteria generated in the first biological treatment process for removing organic substances, bacteria in a dispersed state are most easily preyed upon by animalcules. Bacteria in a floc state can also be satisfactorily preyed upon, as long as, in addition to filter predation animalcules, floc predation animalcules are present in the second biological treatment process. However, in order that bacteria are immediately prayed upon by animalcules, it is advantageous that the size of a single bacterium is smaller than the diameter of the mouth of the animalcules. Regardless of whether the bacteria is in the dispersed state or the floc state, when the bacteria is in a filamentous state, the predation rate is decreased and the effect of reduction in the amount of sludge is also decreased, though some animalcules can prey upon such bacteria.

In order to solve the above problem, in the eighth and ninth aspects, the operation is performed under a condition in which the bacteria generated in the first biological treatment process do not form a filamentous state.

Namely, the HRT in the first biological treatment process is controlled to be in the range of 0.75 to 1.5 times a standard HRT required for performing oxidative decomposition of 70% or more and less than 100% of the organic component (BOD) in standard organic wastewater.

Here, the BOD oxidative decomposition ratio of the standard-HRT is less than 100%, and thus the BOD is not completely subjected to oxidative decomposition. The reason for this is as follows. Non-flocculating bacteria tend to form a filamentous state or a floc under a condition in which the BOD is not present in the system. In order to prevent this phenomenon, the BOD oxidative decomposition ratio is determined as described above. The reason that the BOD oxidative decomposition ratio of the standard HRT is 70% is to prevent more than 30% of the BOD from transferring to the second biological treatment process. When more than 30% of the BOD is transferred to the second biological treatment process, a satisfactory reduction in the amount of sludge cannot be achieved. The reason for this is as follows. In such a case, in the second biological treatment process, non-flocculating bacteria decompose the above BOD at an amount of more than 30% while the bacteria form filamentous state. Consequently, the animalcules do not easily prey upon the bacteria. As a result, a satisfactory reduction in the amount of sludge cannot be achieved.

The volume of the organic wastewater varies with time, the HRT being calculated by dividing the volume of the treatment tank (L) by the flow rate of treated water (L/h). Accordingly, when the volume of the organic wastewater is decreased, the HRT is increased. Consequently, the non-flocculating bacteria form a floc or filamentous state. The predation rate in the second biological treatment process is decreased and the reduction in the amount of sludge is also decreased.

Consequently, in the eighth aspect, when the volume of the organic wastewater is decreased, a liquid is added to the organic wastewater supplied to the first biological treatment process so that the volume of water treated in the first biological treatment process is constant to stabilize the HRT in the first biological treatment process. As described in claim 42, treated water obtained after the second biological treatment process can be suitably used as the liquid.

In the ninth aspect, the volume of water in the treatment tank for the first biological treatment process is changed according to the variation in the volume of the organic wastewater, thus stabilizing the HRT in the first biological treatment process.

Thus, according to the eighth and ninth aspects, the HRT in the first biological treatment process is controlled to be in the range of 0.75 to 1.5 times the standard HRT that satisfies a BOD oxidative decomposition ratio of standard organic wastewater in the range of 70% or more and less than 100%. Thereby, the non-flocculating bacteria generated in the first biological treatment process can be supplied to the second biological treatment process without forming the filamentous state or the floc. Consequently, in the second biological treatment process, the concentration of animalcules can be stabilized at a high value to achieve a satisfactory reduction in the amount of sludge.

Optimally, the HRT in the first biological treatment process is controlled to be the standard HRT. In general, however, when the HRT in the first biological treatment process is in the range of 0.75 to 1.5 times the standard HRT, the advantages of the present invention can be satisfactorily realized. The HRT in the first biological treatment process is preferably controlled to be in the range of 0.9 to 1.2 times the standard HRT, and particularly preferably 0.95 to 1.05 times the standard HRT.

In the case where the BOD concentration in organic wastewater considerably varies, even when the HRT in the first biological treatment process is controlled to be in the range of 0.75 to 1.5 times the standard HRT determined for standard organic wastewater, the following problem may occur. Namely, when the BOD concentration of the organic wastewater is decreased to 50% or less of the BOD concentration of the standard organic wastewater, and then returned to the standard BOD concentration again, in the first biological treatment process, the transformation of the BOD to the bacteria cannot catch up with the variation and the BOD that is not decomposed and remains in the first biological treatment process is supplied to the second biological treatment-process. The BOD supplied to the second biological treatment process is subjected to oxidative decomposition in the second biological treatment process. It is known that when the oxidative decomposition of the BOD by bacteria is performed in the second biological treatment process in which a large amount of animalcules are present, the bacteria proliferate in a form that enables their escape from the animalcules that perform predation. A group of bacteria thus proliferated are not preyed upon by the animalcules, and thus the decomposition of the bacteria depends on only the autolysis thereof, resulting in a decrease in the effect of reduction in the amount of sludge generated.

When the first biological treatment process is a fluidized-bed-type biological treatment process in which a carrier is added to the treatment tank, the problem caused by variations in the BOD concentration of organic wastewater can be solved as follows: Biomembranes adhered to the carrier serve as a supply source for the bacteria in the first biological treatment process, the bacteria being reduced when the load is decreased. When the load is recovered again, the bacteria immediately proliferate, thus stabilizing the BOD removal ratio in the first biological treatment process.

The preferred embodiments of the process for biological treatment of organic wastewater of the eighth and ninth aspects will now be described in detail with reference to the drawings.

FIGS. 20 to 23 are flow diagrams showing preferred embodiments of the process for biological treatment of organic wastewater of the eighth and ninth aspects. In FIGS. 20 to 23, reference numeral 1 indicates a first biological treatment tank, reference numeral 2 indicates a second biological treatment tank, reference numeral 3 indicates a sedimentation tank, reference numeral 54 indicates a flow meter, reference numeral 55 indicates an equalizing tank, reference numeral 55A indicates a raw water storage tank, reference numeral 55B indicates a treated water tank, reference numeral 56 indicates a raw water pump, reference numeral 57 indicates a water level-adjusting pump, reference numeral 58 indicates a carrier-separating screen, and reference numeral 59 indicates a carrier.

In any process, raw water (organic wastewater) is first introduced into a first biological treatment tank (dispersed bacteria tank) 1, and at least 70%, preferably at least 80%, and more preferably at least 90% of the BOD (organic component) is subjected to oxidative decomposition by non-flocculating bacteria. The pH of the first biological treatment tank 1 is 6 or more, preferably in the range of pH 6 to 8. The BOD volume load in the first biological treatment tank 1 is 1 kg/m$^3$/d or more, for example, 1 to 20 kg/m$^3$/d. The hydraulic retention time (HRT) is 24 hours or less, for example, 0.5 to 24 hours, and is controlled to be in the range of 0.75 to 1.5 times a standard HRT determined in advance by a method described below. In such a case, preferably, treated water in which the non-flocculating bacteria are dominant can be obtained, and by reducing the HRT, wastewater having a low BOD concentration can be treated at a high load.

The treated water in the first biological treatment tank 1 is introduced into a second biological treatment tank (animalcule tank) 2. In this second biological treatment tank 2, the oxidative decomposition of the remaining organic component, the autolysis of the non-flocculating bacteria, and the predation by the animalcules are performed, thereby reducing the amount of sludge. The treatment in the second biological treatment tank 2 is performed under a condition of pH 6 or more, and preferably pH 6 to 8.

The treated water in the second biological treatment tank 2 is subjected to solid-liquid separation in a sedimentation tank 3. The separated water is discharged as treated water outside the system. A part of the separated sludge is discharged as excess sludge outside the system, and the rest is returned to the second biological treatment tank 2. This sludge return is performed in order to maintain the amount of sludge in each biological treatment tank. For example, when the first biological treatment tank 1 and/or the second biological treatment tank 2 is a carrier-containing fluidized-bed-type tank described below, the sludge return is not essential. When the BOD volume load of the first biological treatment tank 1 is low, as shown in the figures, the sludge may be returned to only the second biological treatment tank 2. Alternatively, the sludge may be returned to the first biological treatment tank 1 or both the first biological treatment tank 1 and the second biological treatment tank 2. In addition, a third biological treatment tank may be provided to treat sludge drained from the second biological treatment tank or the sedimentation tank, thereby further reducing the amount of sludge. Sludge drained from the third biological treatment tank may be returned to the first biological treatment tank and/or the second biological treatment tank without further treatment. Alternatively, the sludge drained from the third biological treatment tank may be subjected to solid-liquid separation to treat as excess sludge. In this case, a part of or all of the supernatant liquid may be returned to the first biological treatment tank and/or the second biological treatment tank. A part of or all of the solid content may be returned to the first biological treatment tank and/or the second biological treatment tank or may be treated as dehydrated sludge. The biological treatment may be anaerobic treatment or aerobic treatment.

In the eighth and ninth aspects, a standard HRT is determined in advance by a test on the desk or the like. The HRT in the first biological treatment tank 1 is controlled so as to be in the range of 0.75 to 1.5 times the standard HRT.

For example, the standard HRT is determined by the following method of a test on the desk. When target organic wastewater is continuously supplied to and drained from a culture tank at a constant rate, a state in which the proliferation of the bacteria is equilibrated with the dilution of the bacteria by the supply of the organic wastewater is generated. The optimum hydraulic retention time (HRT) is calculated from a supply rate of the wastewater at which the wastewater BOD remaining at that time is 30% or less, preferably 20% or less of the initial BOD of the wastewater. Alternatively, a decomposition rate of the target wastewater may be determined from a batch experiment instead of the above continuous experiment, and the optimum HRT may be determined from the result. When the wastewater contains a large-amount of persistent components and the optimum HRT is increased or when the wastewater contains a large amount of components whose decomposition rates are different from each other, some treatment is preferably performed for the target wastewater so as to accelerate the decomposition of the persistent components. In such a case, 70% or more, preferably 80% or more, of the organic components in the wastewater are preferably decomposed at an HRT of 24 hours or less, preferably 12 hours or less. Examples of the method of accelerating the decomposition of the persistent components include chemical treatments with a chemical such as an acid or an alkali; biological treatments using a specified bacterium, an enzyme, or the like; and physical treatments.

In the eighth and ninth aspects, the standard HRT is an HRT required for converting 70% or more and less than 100% of the BOD in standard organic wastewater into bacteria. Preferably, the standard HRT is set as an HRT required for converting 75% or more, in particular, from 80% to 95% of the BOD into bacteria.

As described above, the HRT in the first biological treatment tank 1 is preferably controlled in the range of 0.9 to 1.2 times the standard HRT, and particularly preferably 0.95 to 1.05 times the standard HRT.

Figure 20:
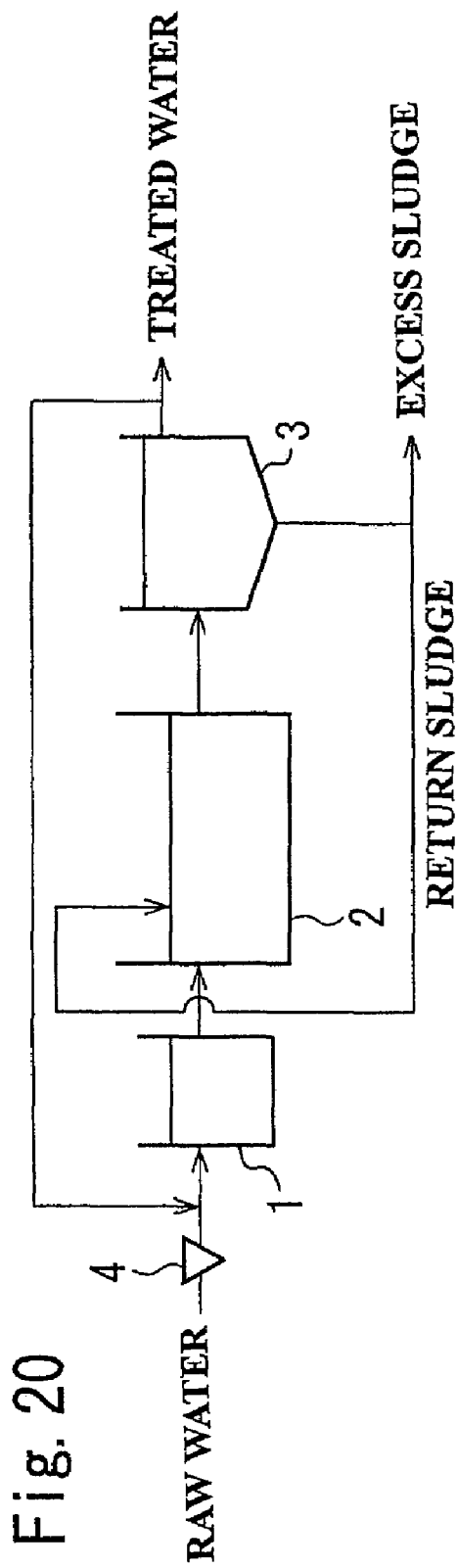
FIG. 20 is a flow diagram showing an embodiment of a process for biological treatment of organic wastewater of the present invention.

In a process shown in FIG. 20, the treated water of the sedimentation tank 3 is returned to the side of the first biological treatment tank 1 at which the raw water is introduced so that the HRT in the first biological treatment tank 1 is controlled to be a predetermined value.

Namely, the flow rate of the raw water is measured with a flow meter 54. When the amount of raw water is insufficient and the predetermined HRT is not maintained, the treated water compensates for the shortfall. Thus, the HRT in the first biological treatment tank 1 is controlled in the predetermined range by controlling the sum of the amount of raw water and the amount of treated water that is returned.

Figure 21:
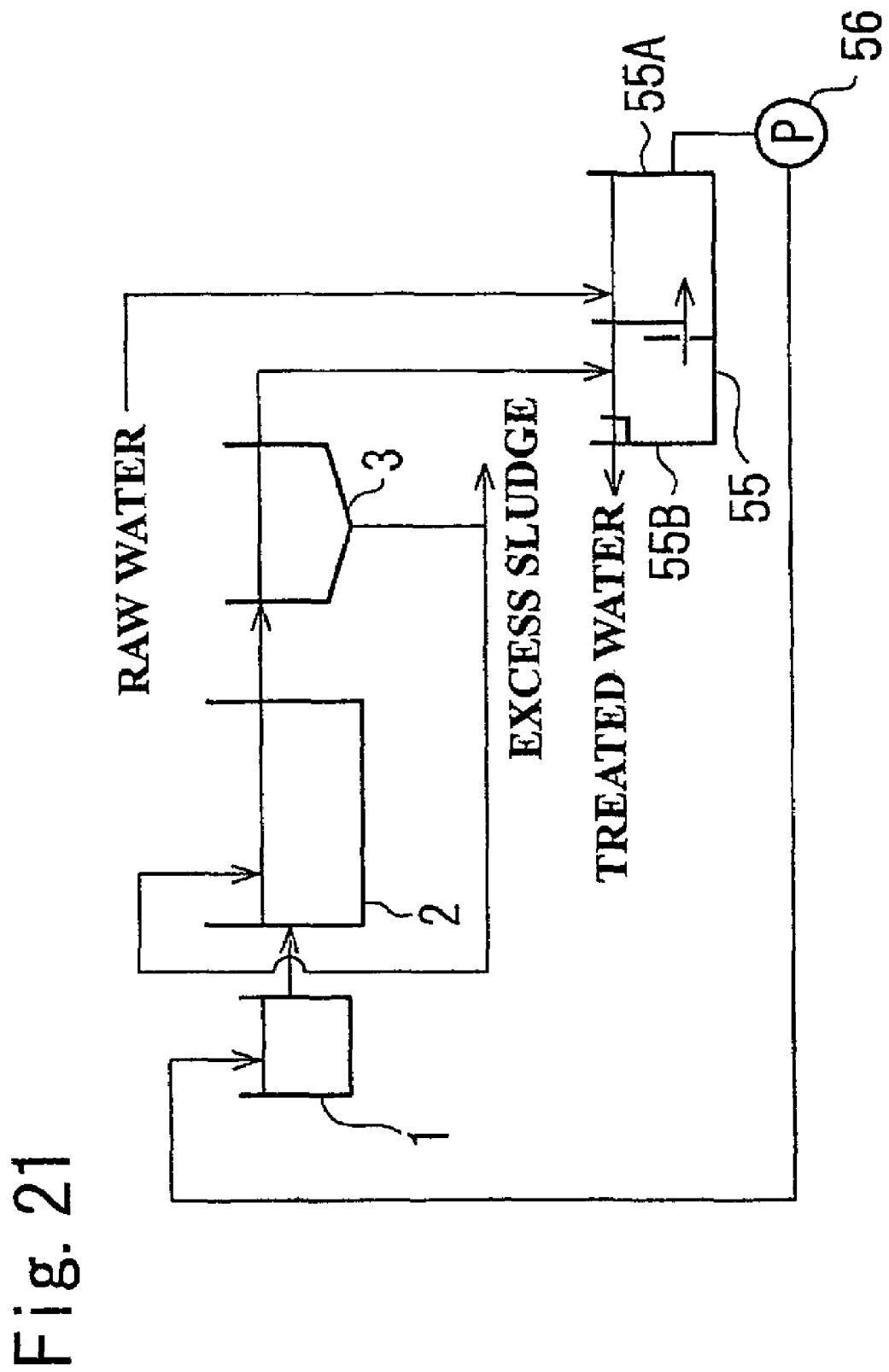
FIG. 21 is a flow diagram showing another embodiment of the process for biological treatment of organic wastewater of the present invention.

A process shown in FIG. 21 also controls the liquid volume supplied to the first biological treatment tank 1. In FIG. 21, an equalizing tank 55 is provided in which a raw water storage tank 55A and a treated water tank 55B are adjacent to each other. Water to be treated is supplied from the equalizing tank 55 to the first biological treatment tank 1 using a raw water pump 56 at a predetermined flow rate. The equalizing tank 55 includes a partition wall having a liquid communication part provided between both tanks so that the treated water in the treated water tank 55B is supplied to the raw water storage tank 55A according to the water level of the raw water storage tank 55A. The variation in the amount of raw water is compensated by the equalizing tank 55, and the raw water or the raw water and the treated water are supplied to the first biological treatment tank 1 at a constant flow rate. Thus, the HRT in the first biological treatment tank 1 can be maintained within the predetermined range. In this process shown in FIG. 21, since the equalizing tank 55 is provided, the flow meter 54 shown in FIG. 20 and a treated water-returning pump (not shown in FIG. 20) can be omitted. Thus, the control of the HRT can be simplified.

Figure 22:
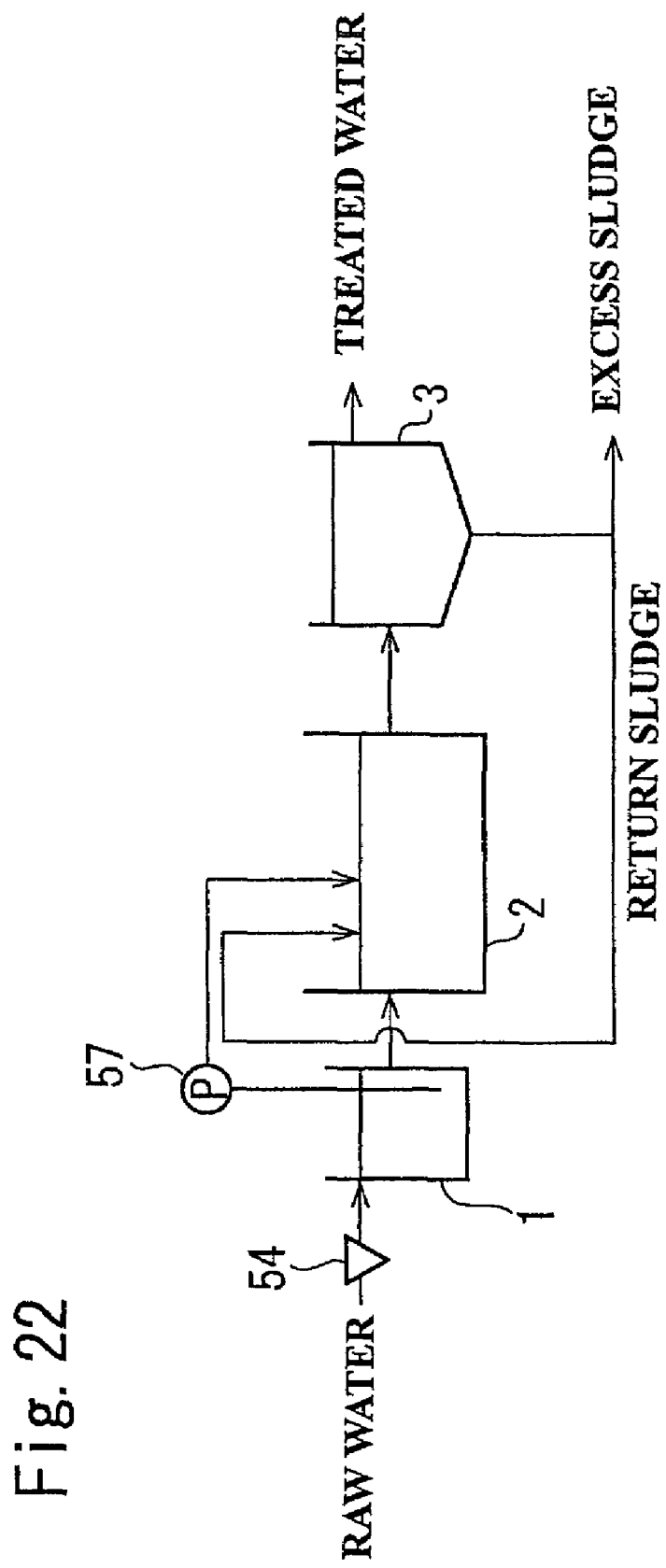
FIG. 22 is a flow diagram showing another embodiment of the process for biological treatment of organic wastewater of the present invention.

In a process shown in FIG. 22, a water level-adjusting pump 57 is provided in the first biological treatment tank 1. When the amount of raw water supplied to the first biological treatment tank 1 is small and the HRT in the first biological treatment tank 1 tends to increase, water in the first biological treatment tank 1 is forcibly transferred to the second biological treatment tank 2 with the water level-adjusting pump 57 so as to reduce the apparent amount of water retention in the first biological treatment tank 1. Thus, the HRT in the first biological treatment tank 1 is maintained within a predetermined range.

Figure 23:
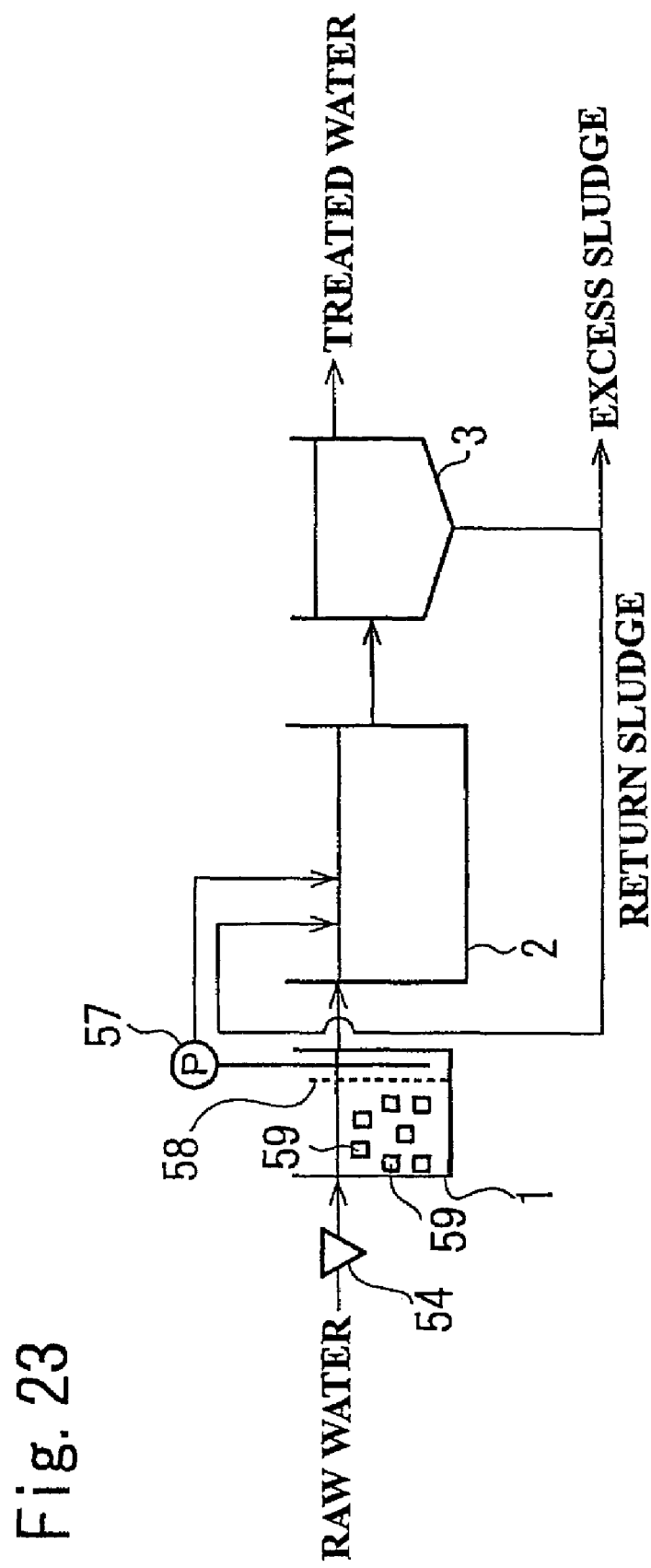
FIG. 23 is a flow diagram showing another embodiment of the process for biological treatment of organic wastewater of the present invention.

In a process shown in FIG. 23, a carrier-separating screen 58 is provided in the first biological treatment tank 1 in the process shown in FIG. 22. Carriers 59 are charged to the side of the screen 58 at which raw water is introduced, and a water level-adjusting pump 57 is provided at the side of the screen 58 at which treated water is discharged. As in the process shown in FIG. 22, the water in the first biological treatment tank 1 is forcibly transferred to the second biological treatment tank 2 with the water level-adjusting pump 57 so as to reduce the apparent amount of water retention in the first biological treatment tank 1. Thus, the HRT in the first biological treatment tank 1 is maintained within a predetermined range.

In the process shown in FIG. 23, since the carriers 59 are charged in the first biological treatment tank 1, as described above, the BOD removal ratio in the first biological treatment tank 1 can be stabilized against variations in the BOD concentration of the raw water.

The additive ratio of the carrier in the first biological treatment tank 1 (hereinafter referred to as "filling ratio in the tank") is preferably in the range of 0.1% to 20%, more preferably in the range of 1% to 10%, or particularly preferably in the range of 2% to 5% relative to the effective volume of the first biological treatment tank 1. The added carrier may have any shape, for example, a spherical shape, pellets, a hollow cylindrical shape, or a filamentous shape, and may have a diameter of about 0.1 to 10 mm. Examples of the material of the carrier include, but are not limited to, natural materials, inorganic materials, and polymer materials. A gel substance may also be used.

The carrier may be added to the first biological treatment tank 1 in the processes shown in FIGS. 20 and 21. In a structure in which the water in the first biological treatment tank 1 is transferred to the second biological treatment tank 2 using the water level-adjusting pump 57, as shown in FIG. 23, the carrier-separating screen 58 extending to the bottom of the first biological treatment tank 1 must be provided. In this case, biomembranes peeled off from the carriers may clog in the screen 58, the discharge of the SS may be disturbed, and the sludge retention time may be increased. In order to prevent this problem, the screen 58 preferably has an opening of 5 mm or more and, in this case, the added carrier 59 preferably has a diameter of 5 mm or more.

The processes shown in FIGS. 20 to 23 show examples of the eighth and ninth aspects. The eighth and ninth aspects are not limited to the processes shown in the figures as long as the processes do not depart from the essence of the aspects. For example, the liquid added to the raw water for controlling the HRT may be industrial water, well water, city water, river water, or the like, instead of the treated water. Preferably the treated water is used.

The carrier may be added not only to the first biological treatment tank 1 but also to the second biological treatment tank 2. In each of the first biological treatment tank 1 and the second biological treatment tank 2, two or more biological treatment tanks may be provided in series to perform a multistage treatment. Alternatively, a separation membrane may be immersed in the tank to perform a membrane-separation-type activated sludge treatment.

As the temperature increases, the activity, i.e., the BOD-decomposing ability, of bacteria increases. As the temperature decreases, the BOD-decomposing ability of bacteria decreases. That is, as the temperature increases, the HRT in the first biological treatment tank required for obtaining a predetermined BOD oxidative decomposition ratio decreases, and as the temperature decreases, the HRT increases. Consequently, regarding raw water in which the variation in the temperature is 5° C. or more from a standard temperature, preferably, the HRT in the first biological treatment tank is controlled as follows. A change in the optimum HRT depending on the temperature is checked in advance from a test on the desk. When the temperature changes, a standard HRT in which the effect of the temperature is considered is set in advance. The HRT in the first biological treatment tank is then preferably controlled in the range of 0.75 to 1.5 times the above standard HRT, more preferably 0.9 to 1.2 times the standard HRT, and particularly preferably 0.95 to 1.05 times the standard HRT.

Similarly, when the BOD concentration of the raw water markedly varies from the standard BOD concentration, a standard HRT based on the variation in the BOD concentration is set in advance. The HRT in the first biological treatment tank is then preferably controlled in the range of 0.75 to 1.5 times the above standard HRT, more preferably 0.9 to 1.2 times the standard HRT, and particularly preferably 0.95 to 1.05 times the standard HRT.

According to the process for biological treatment of organic wastewater of the present invention in which the HRT in the first biological treatment tank 1 is controlled in a predetermined range as described above, the density of animalcules in the second biological treatment tank 2 is increased, and thus the ratio of animalcules to SS in the tank is maintained at 10% or more. Consequently, as is apparent from the results of examples describe below, the reduction in the amount of sludge generated can be stably at least 50% that in the case of an existing activated sludge process.

EXAMPLES AND COMPARATIVE EXAMPLES OF THE EIGHTH AND NINTH ASPECTS

The eighth and ninth aspects will now be described more specifically by way of examples and comparative examples.

Example 12

A treatment of organic wastewater was performed by the process of the present invention shown in FIG. 1 using an experimental apparatus in which an activated sludge tank (not including a sludge return) with a volume of 3.6 L serving as a first biological treatment tank 1 was connected to an activated sludge tank with a volume of 15 L serving as a second biological treatment tank 2. The pH of the first biological treatment tank 1 was adjusted to 6.8 and the pH of the second biological treatment tank 2 was adjusted to 6.8. The operation was performed under the following conditions: In the first biological treatment tank 1, the soluble BOD volume load was 3.85 kg-BOD/m$^3$/d and the HRT was 4 hours. In the second biological treatment tank 2, the soluble BOD sludge load was 0.022 kg-BOD/kg-SS/d and the HRT was 17 hours. As a hole, the BOD volume load was 0.75 kg-BOD/m$^3$/d and the HRT was 21 hours. The experiment was performed in a 20° C. thermostatic chamber. As a result, the sludge conversion ratio was 0.18 kg-SS/kg-BOD. The HRT in the first biological treatment tank 1 required for performing oxidative decomposition of 75% of the BOD in the raw water was calculated in advance as 4 hours from a test on the desk.

After one month from the initiation of the operation, a load-changing operation was performed as follows. The operation was performed under the same conditions for 12 hours. Subsequently, the flow rate of the substrate was decreased by half, and the amount of water corresponding to the decrease was supplemented with the treated water (during this operation, the BOD volume load decreased by half). The operation was performed under this condition for 12 hours. Thus, these two operations were alternately repeated. As a result, the HRT in the first biological treatment tank 1 was maintained at about 4 hours and the dispersed state of the bacteria in the first biological treatment tank 1 was also maintained. However, when the load was decreased by half, the concentration of the dispersed bacteria decreased, and when the load was recovered, the reproliferation of the dispersed bacteria was not sufficient. Consequently, the organic substance in the wastewater was not decomposed and the remaining organic substance entered the second biological treatment tank 2 in some cases. As a result, the sludge conversion ratio was slightly increased to 0.28 kg-SS/kg-BOD.

During the operation, *Bdelloida* was dominant in the second biological treatment tank 2. Before the load-changing operation, the number of animalcules was in the range of 55,000 to 70,000 per milliliter and the ratio of animalcules to SS in the tank was 20%. After the initiation of the load-changing operation, the number of animalcules was about 30,000 per milliliter.

Example 13

The operation was performed under the same conditions as in Example 12 except that sponges each having a diameter of 5 mm were added to the first biological treatment tank 1 at a filling ratio of 5% in the tank, and thus a fluidized-bed-type activated sludge process was performed in the first biological treatment tank 1.

As a result, even after the initiation of the load-changing operation, the HRT in the first biological treatment tank 1 was maintained at about 4 hours and the dispersed state of the bacteria in the first biological treatment tank 1 was also maintained. Furthermore, the sludge conversion ratio was also maintained at 0.18 kg-SS/kg-BOD.

During the operation, before and after the change in the high load, *Bdelloida* was dominant in the second biological treatment tank 2, the number of animalcules was in the range of 55,000 to 70,000 per milliliter, and the ratio of animalcules to SS in the tank was 20%.

Comparative Example 9

A treatment was performed as in Example 12 except for using an experimental apparatus that did not include the first biological treatment tank but that was composed of only the second biological treatment tank with a volume of 15 L. The experiment was performed in a 20° C. thermostatic chamber. The operation was continuously performed for one month under a condition of a soluble BOD volume load of 0.76 kg-BOD/m$^3$/d and an HRT of 20 hours. As a result, although the quality of the treated water was satisfactory, the sludge conversion ratio was 0.40 kg-SS/kg-BOD.

The operation in which the flow rate of the substrate was decreased by half (during this operation, the BOD volume load decreased by half) was also performed for 12 hours. Thus, these two operations were alternately repeated every 12 hours as in Example 12 to perform the load-changing operation. As a result, the sludge conversion ratio was not changed and was 0.40 kg-SS/kg-BOD. During the operation, *Bdelloida* was observed at a rate of 3,000 per milliliter and *Vorticella* was observed at a rate of 10,000 per milliliter in the activated sludge tank, but the ratio of animalcules to SS in the tank was constantly 5% or less.

Comparative Example 10

The operation was performed under the same conditions as in Example 12 except that, after the load-changing operation when the flow rate of the substrate was decreased by half, the treated water was not returned.

As a result, before the load-changing operation, the sludge conversion ratio was 0.18 kg-SS/kg-BOD as in Example 12. However, after the initiation of the load-changing operation, in the first biological treatment tank 1, dispersed-state filamentous bacteria (50 to 1,000 μm in length) were dominant. In the second biological treatment tank 2, *Bdelloida*, which was dominant before the load was changed, was decreased from 50,000 per milliliter to zero per milliliter. In addition, the sludge conversion ratio was increased to 0.34 kg-SS/kg-BOD.

Figure 24:
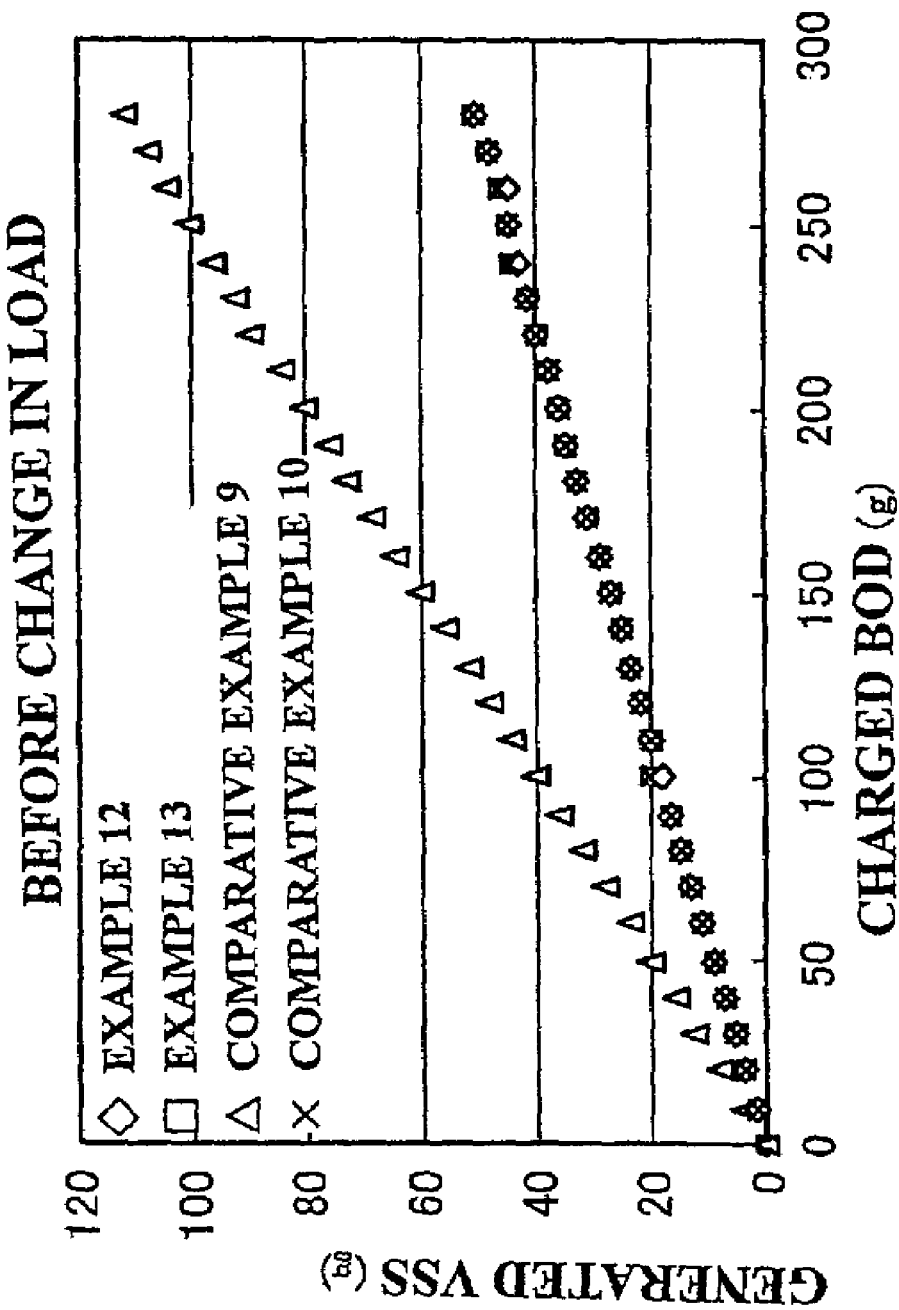
FIG. 24 is a graph showing the relationship (before a change in load) between the amount of charged BOD and the amount of excess sludge generated in Examples 12 and 13 and Comparative Examples 9 and 10.
Figure 25:
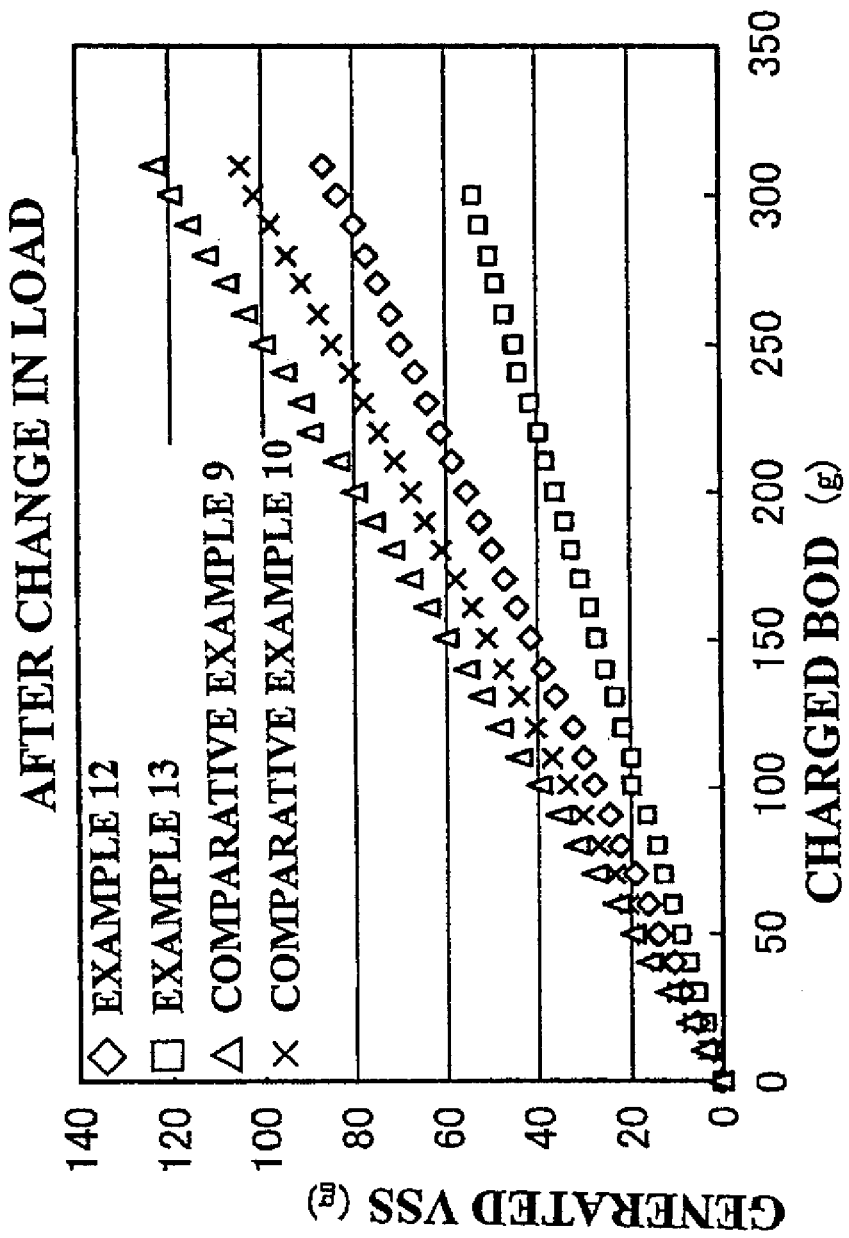
FIG. 25 is a graph showing the relationship (after the change in load) between the amount of charged BOD and the amount of excess sludge generated in Examples 12 and 13 and Comparative Examples 9 and 10.

FIG. 24 shows the relationship between the amount of charged BOD and the amount of generated excess sludge (generated VSS: sludge conversion ratio) before the load-changing operation in Examples 12 and 13 and Comparative Examples 9 and 10. FIG. 25 shows the relationship between the amount of charged BOD and the amount of generated excess sludge (generated VSS: sludge conversion ratio) after the initiation of the load-changing operation.

Referring to FIGS. 24 and 25, regardless of before or after the change in the load, multistage activated sludge processes involving a predation effect caused by animalcules can provide a marked reduction in the amount of sludge. In the treatment using the multistage activated sludge processes, according to the present invention, when the HRT in the first biological treatment tank is maintained within a predetermined range, furthermore, when a carrier is added to the first biological treatment tank to perform a fluidized-bed-type activated sludge process, a stable reduction in the amount of sludge can be achieved despite the variation in the load.

The invention claimed is:

1. A process for biological treatment of organic wastewater, comprising:
   a first biological treatment process for treating BOD in organic wastewater at a high load to convert more than 70% of the BOD to dispersed bacteria; and
   a second biological treatment process for forming the converted dispersed bacteria into a floc and allowing microorganisms to coexist,
   wherein the first biological treatment process is performed under a condition of pH 6-8, and the second biological treatment process is performed under a condition of pH 5 to 6.

2. The process for biological treatment of organic wastewater according to claim 1, wherein the second biological treatment process is a multistage treatment including two or more stages, and the second biological treatment process includes a biological treatment performed at a pH in the range of 5 to 6 and a subsequent biological treatment performed at a pH 6 or more.

3. The process for biological treatment of organic wastewater according to claim 1, wherein the second biological treatment process is a sludge return-type biological treatment process in which solid-liquid separating means is provided at the latter stage of a biological treatment tank and sludge subjected to the solid-liquid separation is returned to the biological treatment tank, a fluidized-bed-type biological treatment process in which a carrier is added to a biological treatment tank, or a membrane-separation-type biological treatment process.

4. The process for biological treatment of organic wastewater according to claim 1, wherein the first biological treatment process is a fluidized-bed-type biological treatment process in which a carrier is added to a biological treatment tank, or a multistage treatment process including two or more stages.

5. A process for biological treatment of organic wastewater, comprising:
   a first biological treatment process for treating BOD in organic wastewater at a high load to convert the BOD to dispersed bacteria; and
   a second biological treatment process for forming the converted dispersed bacteria into a floc and allowing microorganisms to coexist; and
   an excess sludge treatment process for decomposing at least a part of sludge in the second biological treatment process and/or sludge obtained by performing solid-liquid separation of sludge in the second biological treatment process under aerobic conditions,
   wherein the sludge treated in the excess sludge treatment process is returned to the first biological treatment process and/or the second biological treatment process, and the excess sludge treatment process is performed under a condition of pH 5 to 6.

6. The process for biological treatment of organic wastewater according to claim 5, wherein the excess sludge treatment process is a sludge return-type biological treatment process in which solid-liquid separating means is provided at the latter stage of a biological treatment tank and sludge subjected to the solid-liquid separation is returned to the biological treatment tank, or a fluidized-bed-type biological treatment process in which a carrier is added to a biological treatment tank.

7. The process for biological treatment of organic wastewater according to claim 5, wherein the second biological treatment process is a sludge return-type biological treatment process in which solid-liquid separating means is provided at the latter stage of a biological treatment tank and sludge subjected to the solid-liquid separation is returned to the biological treatment tank, a fluidized-bed-type biological treatment process in which a carrier is added to a biological treatment tank, or a membrane-separation-type biological treatment process.

8. The process for biological treatment of organic wastewater according to claim 5, wherein the first biological treatment process is a fluidized-bed-type biological treatment process in which a carrier is added to a biological treatment tank, or a multistage treatment process including two or more stages.

9. A process for biological treatment of organic wastewater, comprising introducing organic wastewater into a first biological treatment tank to perform a biological treatment using non-flocculating bacteria, and introducing the treated water containing the non-flocculating bacteria from the first biological treatment tank into a second biological treatment tank to perform an activated sludge treatment,
wherein at least a part of sludge in the second biological treatment tank or sludge obtained by performing solid-liquid separation of sludge in the second biological treatment tank is introduced into an anaerobic treatment process to perform an anaerobic treatment, and the product treated in the anaerobic treatment process is returned to the first biological treatment tank and/or the second biological treatment tank.

10. The process for biological treatment of organic wastewater according to claim 9, wherein the pH of the second biological treatment tank is 6 or less.

11. The process for biological treatment of organic wastewater according to claim 9, wherein the process in the second biological treatment tank is a multistage treatment process including two or more stages, and the process includes a biological treatment performed at a pH 6 or less and a subsequent biological treatment performed at a pH 6 or more.

12. The process for biological treatment of organic wastewater according to claim 9, wherein the product treated in the anaerobic treatment process is subjected to solid-liquid separation, the separated liquid is returned to the first biological treatment tank, and the separated sludge is returned to the second biological treatment tank.

13. A process for biological treatment of organic wastewater, comprising introducing organic wastewater into a first biological treatment tank to perform a biological treatment using non-flocculating bacteria, and introducing the treated water containing the non-flocculating bacteria from the first biological treatment tank into a second biological treatment tank to perform an activated sludge treatment,
wherein at least a part of sludge in the second biological treatment tank or sludge obtained by performing solid-liquid separation of sludge in the second biological treatment tank is introduced into an aerobic treatment process to oxidize it under aerobic conditions, at least a part of the product treated in the aerobic treatment process is introduced into an anaerobic treatment process to perform an anaerobic treatment, and the product treated in the anaerobic treatment process is returned to at least one of the first biological treatment tank, the second biological treatment tank, and the aerobic treatment process.

14. The process for biological treatment of organic wastewater according to claim 13, wherein the product treated in the anaerobic treatment process is subjected to solid-liquid separation, the separated liquid is returned to the first biological treatment tank, and the separated sludge is returned to at least one of the second biological treatment tank, the anaerobic treatment process, and the aerobic treatment process.

15. A process for biological treatment of organic wastewater, comprising introducing organic wastewater into a first biological treatment tank to perform a biological treatment using bacteria, introducing the treated liquid containing the bacteria from the first biological treatment tank into a second biological treatment tank to perform an activated sludge treatment, performing solid-liquid separation of the treated liquid from the second biological treatment tank to separate the treated liquid into sludge and treated water, and returning a part of the sludge to the second biological treatment tank,
wherein a part of the sludge in the second biological treatment tank and/or the rest of the sludge obtained after the solid-liquid separation is introduced into a third biological treatment tank to perform an aerobic treatment, a part of or all of the sludge subjected to the aerobic treatment is dehydrated to separate into solid content and water, the solid content is drained as excess sludge, and the water is returned to the first biological treatment tank and/or the second biological treatment tank.

16. The process for biological treatment of organic wastewater according to claim 15, wherein the pH of the third biological treatment tank is 6 or less.

17. The process for biological treatment of organic wastewater according to claim 15, wherein the sludge retention time of each of the second biological treatment tank and the third biological treatment tank is controlled to 40 days or less.

18. A process for biological treatment of organic wastewater, comprising
introducing organic wastewater into a first biological treatment tank to perform a biological treatment using bacteria,
introducing the treated liquid containing the bacteria from the first biological treatment tank into a second biological treatment tank to perform an activated sludge treatment,
introducing sludge obtained by performing solid-liquid separation of sludge in the second biological treatment tank into a third biological treatment tank to oxidize it under aerobic conditions, and
returning a part of or all of the product treated in the third biological treatment tank to the second biological treatment tank,
wherein the sludge retention time of each of the second biological treatment tank and the third biological treatment tank is controlled to 5 to 40 days.

19. A process for biological treatment of organic wastewater according to claim 18, wherein said bacteria is non-flocculating bacteria, and the treated liquid in the first biological treatment tank is introduced into the second biological treatment tank without solid-liquid separation.

20. A process for biological treatment of organic wastewater according to claim 19, wherein $1/5$ to $1/40$ of the sludge in the second and third biological treatment tanks is drained per day.

* * * * *